US012417703B2

(12) United States Patent
Chiba

(10) Patent No.: US 12,417,703 B2
(45) Date of Patent: Sep. 16, 2025

(54) AUTOMATED VALET PARKING MANAGEMENT SYSTEM AND AUTOMATED VALET PARKING MANAGEMENT METHOD

(71) Applicant: TOYOTA JIDOSHA KABUSHIKI KAISHA, Toyota (JP)

(72) Inventor: Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 18/201,289

(22) Filed: May 24, 2023

(65) Prior Publication Data

US 2023/0419834 A1 Dec. 28, 2023

(30) Foreign Application Priority Data

Jun. 28, 2022 (JP) ................................ 2022-103843

(51) Int. Cl.
*G08G 1/14* (2006.01)

(52) U.S. Cl.
CPC ............ *G08G 1/146* (2013.01); *G08G 1/142* (2013.01)

(58) Field of Classification Search
None
See application file for complete search history.

(56) References Cited

U.S. PATENT DOCUMENTS

2017/0292854 A1* 10/2017 Zhang .................. G05D 1/0088
2017/0329341 A1* 11/2017 Rakshit ................. H04W 4/029
2019/0308616 A1 10/2019 Jie et al.
2020/0180607 A1 6/2020 Choi et al.
2020/0219018 A1 7/2020 Sugano
2020/0311849 A1* 10/2020 Noguchi ................ G06Q 10/02
2021/0295219 A1* 9/2021 Shimamoto ............. H04W 4/44
2022/0172623 A1 6/2022 Hidaka et al.
2023/0136951 A1* 5/2023 Wada .................... B60W 30/06
340/932.2

FOREIGN PATENT DOCUMENTS

JP 2020-511353 A 4/2020
JP 2020-090281 A 6/2020
JP 2020-112909 A 7/2020
JP 2021-080719 A 5/2021
WO 2021/033611 A1 2/2021
WO 2022/019274 A1 1/2022

* cited by examiner

*Primary Examiner* — James J Lee
*Assistant Examiner* — Melanie G Huber
(74) *Attorney, Agent, or Firm* — Dinsmore & Shohl LLP

(57) ABSTRACT

An automated valet parking (AVP) management system executes a tentative allocation process that allocates a tentative parking space on a passage in a parking lot to an entry vehicle, when there is no available regular parking space in the parking lot. In the tentative allocation process, the AVP management system acquires a scheduled exit time of a parked vehicle parked in a regular parking space. When the scheduled exit time of a first parked vehicle is earlier than the scheduled exit time of a second parked vehicle, the AVP management system preferentially allocates the tentative parking space not present on an exit route of the first parked vehicle to the entry vehicle based on the map information and the vehicle management information.

7 Claims, 18 Drawing Sheets

100: AVP MANAGEMENT SYSTEM

AUTOMATED VALET PARKING MANAGEMENT SYSTEM AND AUTOMATED VALET PARKING MANAGEMENT METHOD

CROSS-REFERENCE TO RELATED APPLICATION

This application claims priority to Japanese Patent Application No. 2022-103843 filed on Jun. 28, 2022, the entire contents of which are incorporated by reference herein.

BACKGROUND

Technical Field

The present disclosure relates to a technique for managing automated valet parking (AVP) in a parking lot.

Background Art

Automated valet parking in a parking lot is known. A vehicle that supports the automated valet parking is able to automatically travel at least in a parking lot independently of a driving operation by a driver.

Patent Literature 1 discloses a vehicle control method in a parking lot. When a first vehicle arrives at a parking lot, it is determined whether or not there is an available parking space in the parking lot. When there is no available parking space, a first tentative parking position is selected from among available spaces in the parking lot, and the first vehicle is moved to the first tentative parking position. Thereafter, it is determined whether or not the first vehicle is present on a travel route of a second vehicle. When the first vehicle is present on the travel route of the second vehicle, a second tentative parking position that does not obstruct passage of the second vehicle is specified. Then, the first vehicle is moved from the first tentative parking position to the second tentative parking position.

Patent Literature 2 and Patent Literature 3 also disclose techniques related to automated valet parking.

LIST OF RELATED ART

Patent Literature 1: Japanese Translation of PCT International Publication No. JP-2020-511353

Patent Literature 2: Japanese Laid-Open Patent Application No. JP-2020-090281

Patent Literature 3: International Publication No. WO2021/033611

SUMMARY

Automated valet parking in a parking lot is considered. When there is no available parking space in the parking lot, a part of a passage other than the parking space may be used as a tentative parking space. However, allocating the tentative parking space without any plan causes an increase in probability that a vehicle parked in the tentative parking space on the passage hinders exiting of an exit vehicle.

An object of the present disclosure is to provide a technique capable of reducing a probability that exiting of an exit vehicle is hindered, in automated valet parking that utilizes a tentative parking space on a passage.

A first aspect is directed to an automated valet parking management system for managing automated valet parking in a parking lot.

The automated valet parking management system includes:

one or more processors; and one or more memory devices configured to store map information of the parking lot and vehicle management information for managing a vehicle being a target of the automated valet parking.

The one or more processors are configured to execute a tentative allocation process that allocates a tentative parking space on a passage in the parking lot to an entry vehicle, when there is no available regular parking space in the parking lot.

In the tentative allocation process, the one or more processors are configured to:

acquire a scheduled exit time of a parked vehicle parked in a regular parking space, based on the vehicle management information; and when the scheduled exit time of a first parked vehicle is earlier than the scheduled exit time of a second parked vehicle, preferentially allocate the tentative parking space not present on an exit route of the first parked vehicle to the entry vehicle based on the map information and the vehicle management information.

A second aspect is directed to an automated valet parking management method that is executed by a computer and manages automated valet parking in a parking lot.

The automated valet parking management method includes:

acquiring map information of the parking lot and vehicle management information for managing a vehicle being a target of the automated valet parking; and executing a tentative allocation process that allocates a tentative parking space on a passage in the parking lot to an entry vehicle, when there is no available regular parking space in the parking lot.

The tentative allocation process includes:

acquiring a scheduled exit time of a parked vehicle parked in a regular parking space, based on the vehicle management information; and when the scheduled exit time of a first parked vehicle is earlier than the scheduled exit time of a second parked vehicle, preferentially allocating the tentative parking space not present on an exit route of the first parked vehicle to the entry vehicle based on the map information and the vehicle management information.

According to the present disclosure, the tentative parking space is allocated to the entry vehicle so as to avoid the exit route of the first parked vehicle having the earlier scheduled exit time as much as possible. As a result, the probability that the vehicle parked in the tentative parking space hinders the exiting of the exit vehicle is reduced.

EMBODIMENTS

Embodiments of the present disclosure will be described with reference to the accompanying drawings.

1. Overview of Automated Valet Parking

Figure 1:
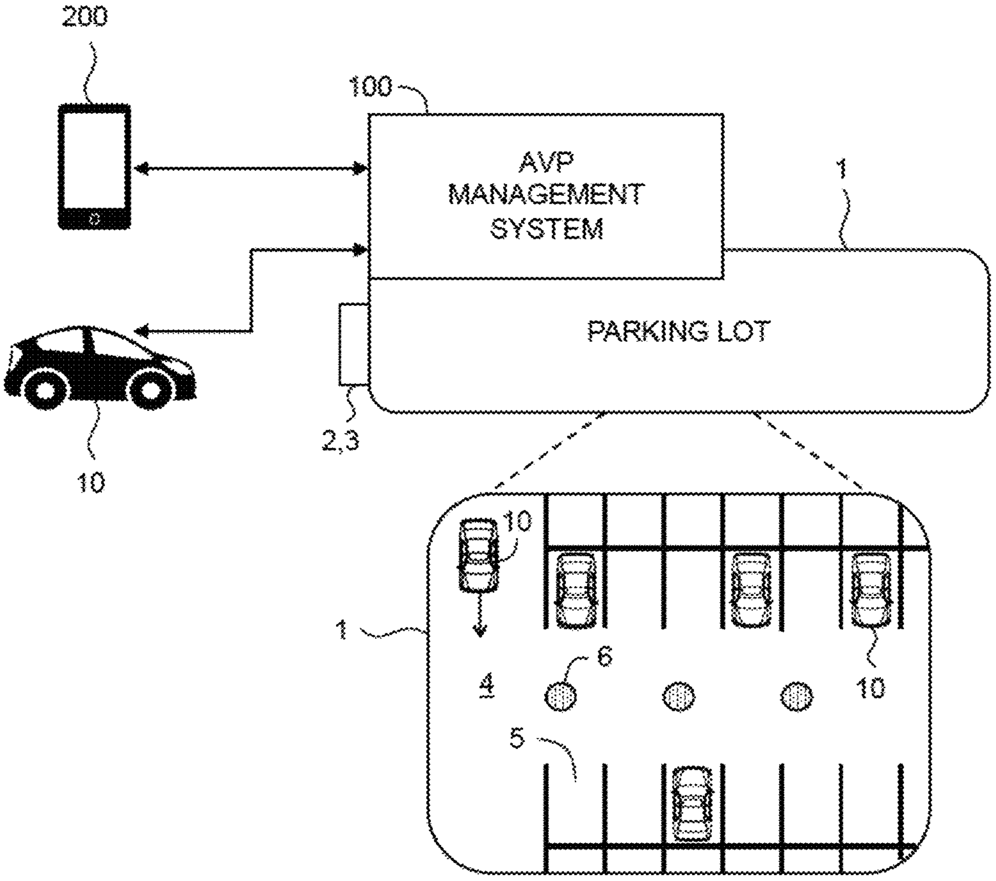
FIG. 1 is a conceptual diagram for explaining an overview of automated valet parking according to an embodiment of the present disclosure.

FIG. 1 is a conceptual diagram for explaining an overview of automated valet parking (AVP) according to the present embodiment.

A vehicle 10 supports the automated valet parking in a parking lot 1. The vehicle 10 is able to automatically travel at least in the parking lot 1 independently of a driving operation by a driver. More specifically, the vehicle 10 is provided with a recognition sensor (e.g., a camera) for recognizing a surrounding situation. The vehicle 10 automatically travels in the parking lot 1 while recognizing the surrounding situation by using the recognition sensor. The vehicle 10 may be an autonomous driving vehicle.

The parking lot 1 includes a drop-off area 2, a pick-up area 3, a passage 4, and a plurality of parking spaces 5. The vehicle 10 that enters the parking lot 1 stops at the drop-off area 2, where a user gets off the vehicle 10 there. On the other hand, the vehicle 10 that exits the parking lot 1 stops at the pick-up area 3, where the user gets on the vehicle 10. The drop-off area 2 may be referred to as an entry area, and the pick-up area 3 may be referred to as an exit area. The passage 4 is an area where the vehicle 10 travels. The parking space 5 is a space in which the vehicle 10 is parked. For example, the parking space 5 is partitioned by a partition line.

In addition, a plurality of markers 6 (landmarks) are arranged in the parking lot 1. The marker 6 is used for guiding the vehicle 10 in the parking lot 1. For example, the vehicle 10 acquires an image of the surroundings using a camera, and recognizes the marker 6 based on the image. Then, based on a result of recognition of the marker 6, the vehicle 10 performs localization processing that estimates a position of the vehicle in the parking lot 1 with high accuracy. The vehicle 10 automatically travels in the parking lot 1 based on the vehicle position estimated by the localization processing.

It should be noted that the parking lot 1 may be used not only by the vehicle 10 supporting the automated valet parking but also by a general vehicle other than the vehicle 10.

An automated valet parking management system 100 manages the automated valet parking in the parking lot 1. The automated valet parking management system 100 is hereinafter referred to as an "AVP management system 100." The AVP management system 100 may include a local management device installed in the parking lot 1 and a management center that controls a plurality of parking lots 1.

The AVP management system 100 is capable of communicating with the vehicle 10 and manages the vehicle 10. For example, the AVP management system 100 grasps a position and a state of each vehicle 10 in the parking lot 1. The AVP management system 100 may allocate the parking space 5 to the vehicle 10. The AVP management system 100 may issue a movement instruction (e.g., an entry instruction, an exit instruction) to the vehicle 10 in the parking lot 1. The AVP management system 100 may provide the vehicle 10 with map information of the parking lot 1. The AVP management system 100 may generate a target route of the vehicle 10 in the parking lot 1 and provide the vehicle 10 with information of the target route. The AVP management system 100 may remotely operate the vehicle 10 in the parking lot 1.

In addition, the AVP management system 100 manages information on the user of the automated valet parking service. The AVP management system 100 is able to communicate with a user terminal 200 operated by the user.

Hereinafter, an example of a flow when a certain user X uses the automated valet parking service will be described. It is assumed that member information of the user X is registered in advance in the AVP management system 100.

First, the user X makes a reservation of the automated valet parking. For example, the user X operates the user terminal 200 to input ID information of the user X, a desired parking lot 1, a desired date of use, a desired time of use (i.e., a scheduled entry time and a scheduled exit time), and the like. The user terminal 200 sends reservation information including the input information to the AVP management system 100. The AVP management system 100 executes reservation processing based on the reservation information, and sends a reservation completion notification to the user terminal 200. In addition, the AVP management system 100 sends authentication information associated with the reservation information to the user terminal 200. The user terminal 200 receives the authentication information and holds the received authentication information.

Entry (check-in) of the vehicle 10 into the parking lot 1 is as follows.

The vehicle 10 carrying the user X arrives and stops at the drop-off area 2 of the parking lot 1. At the drop-off area 2, the user X (and other occupants if any) gets off the vehicle 10. Then, the user X requests the entry of the vehicle 10 by using the authentication information held in the user terminal 200. In response to the entry request, the AVP management system 100 conducts authentication of the user X. Upon completion of the authentication, authority to operate the vehicle 10 is transferred from the user X to the AVP management system 100. The AVP management system 100 executes an entry process with respect to the vehicle 10.

In the entry process, the AVP management system 100 communicates with the vehicle 10 to activate the vehicle 10 (power ON).

In addition, the AVP management system 100 allocates an available parking space 5 to the vehicle 10 by referring to a usage status of the parking lot 1. Then, the AVP management system 100 communicates with the vehicle 10 to send an entry instruction to the vehicle 10. The entry instruction includes information of the allocated parking space 5 and the map information of the parking lot 1. The AVP management system 100 may specify a target route from the drop-off area 2 to the allocated parking space 5. In this case, the entry instruction includes information on the specified target route.

In response to the entry instruction, the vehicle 10 initiates vehicle travel control. More specifically, the vehicle 10 automatically travels on the passage 4 from the drop-off area 2 to the allocated parking space 5 and automatically parks in the allocated parking space 5. At this time, the vehicle 10 may travel along the target route specified by the AVP management system 100. The AVP management system 100 may communicate with the vehicle 10 to remotely control the automatic travel of the vehicle 10.

Upon completion of the parking, the vehicle 10 notifies the AVP management system 100 of the parking completion. Alternatively, the AVP management system 100 may use an infrastructure sensor installed in the parking lot 1 to detect completion of the parking of the vehicle 10. After the parking is completed, the AVP management system 100 communicates with the vehicle 10 to deactivate the vehicle 10 (power OFF). The AVP management system 100 holds information of the parking space 5 of the vehicle 10 in association with the user X.

Exit (check-out) of the vehicle 10 from the parking lot 1 is as follows.

The user X requests the exit of the vehicle 10 by using the user terminal 200. The exit request includes the authentication information and the like. In response to the exit request, the AVP management system 100 conducts authentication of the user X and executes an exit process with respect to the vehicle 10.

In the exit process, the AVP management system 100 communicates with the vehicle 10 to activate the vehicle 10 (power ON).

In addition, the AVP management system 100 communicates with the vehicle 10 to send an exit instruction to the vehicle 10. The exit instruction includes a position of the pick-up area 3 and the map information of the parking lot 1. The AVP management system 100 may specify a target route from the parking space 5 to the pick-up area 3. In this case, the exit instruction includes information on the specified target route.

In response to the exit instruction, the vehicle 10 initiates the vehicle travel control. More specifically, the vehicle 10 automatically travels on the passage 4 from the parking space 5 to the pick-up area 3. At this time, the vehicle 10 may travel along the target route specified by the AVP management system 100. The AVP management system 100 may communicate with the vehicle 10 to remotely control the automatic travel of the vehicle 10.

The vehicle 10 arrives and stops at the pick-up area 3. The authority to operate the vehicle 10 is transferred from the AVP management system 100 to the user X. The user X (and other occupants if any) gets on the vehicle 10. The vehicle 10 starts moving toward a next destination.

2. Configuration Example of AVP Management System

Figure 2:
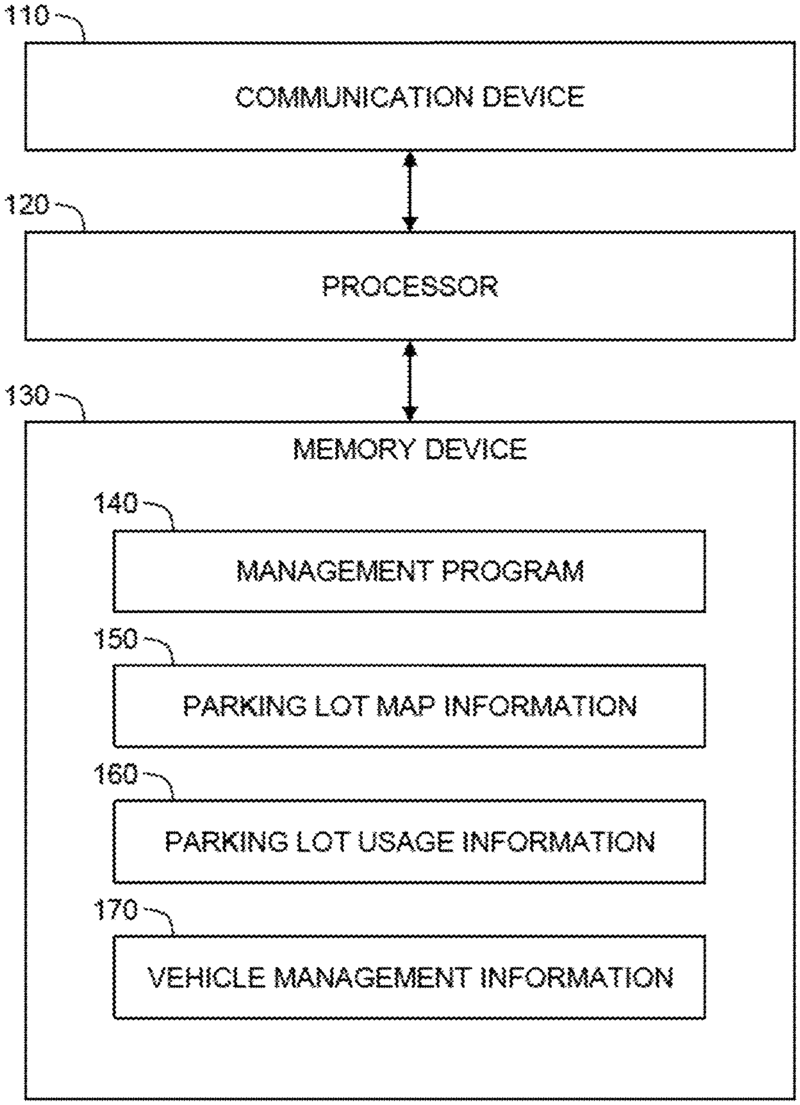
FIG. 2 is a block diagram showing a configuration example of an automated valet parking management system according to an embodiment of the present disclosure.

FIG. 2 is a block diagram showing a configuration example of the AVP management system 100 according to the present embodiment. The AVP management system 100 includes a communication device 110, one or more processors 120 (hereinafter, simply referred to as a processor 120), and one or more memory devices 130 (hereinafter, simply referred to as a memory device 130).

The communication device 110 communicates with the vehicle 10 and the user terminal 200.

The processor 120 executes a variety of processing. For example, the processor 120 includes a central processing unit (CPU). The processor 120 communicates with the vehicle 10 and the user terminal 200 via the communication device 110. In addition, the processor 120 manages the automated valet parking in the parking lot 1. For example, the processor 120 allocates the parking space 5 to the vehicle 10. Further, the processor 120 may instruct the vehicle 10 in the parking lot 1 to move.

The memory device 130 stores a variety of information. Examples of the memory device 130 include a volatile memory, a nonvolatile memory, a hard disk drive (HDD), a solid state drive (SSD), and the like. The processor 120 reads out the variety of information from the memory device 130 and stores the variety of information in the memory device 130.

A management program 140 is a computer program for managing the automated valet parking. Various functions of the AVP management system 100 (the processor 120) may be implemented by the processor 120 executing the management program 140. The management program 140 is stored in the memory device 130. The management program 140 may be recorded on a non-transitory computer-readable recording medium.

In addition, the memory device 130 stores parking lot map information 150, parking lot usage information 160, vehicle management information 170, and the like. The parking lot map information 150 is the map information of the parking lot 1. The parking lot map information 150 indicates the arrangement of the drop-off area 2, the pick-up area 3, the passage 4, the parking spaces 5, the markers 6, and the like in the parking lot 1. The parking lot usage information 160 indicates a usage status (availability) of the parking space 5 in the parking lot 1. The vehicle management information 170 is information for managing the vehicle 10 that is a target of the automated valet parking.

Figure 3:
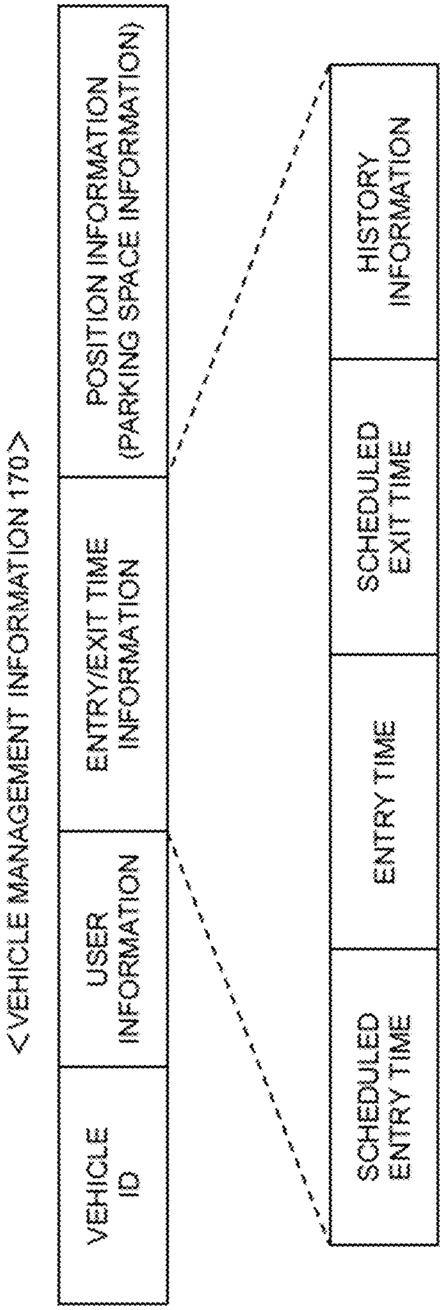
FIG. 3 is a conceptual diagram showing an example of vehicle management information according to an embodiment of the present disclosure.

FIG. 3 is a conceptual diagram showing an example of the vehicle management information 170. The vehicle management information 170 includes a vehicle ID, user information, entry/exit time information, and position information. The vehicle ID, the user information, the entry/exit time information, and the position information are associated with each other for each vehicle 10.

The vehicle ID is identification information of the vehicle 10. The user information is information on the user who uses the vehicle 10.

The entry/exit time information is information on entry/exit times of the vehicle 10. For example, the entry/exit time information includes a scheduled entry time, an actual entry time, and a scheduled exit time. The scheduled entry time is a time at which the vehicle 10 is scheduled to enter the parking lot 1. The scheduled exit time is a time at which the vehicle 10 is scheduled to exit the parking lot 1. For example, at the time of the reservation of the automated valet parking service, the scheduled entry time and the scheduled exit time are specified by the user of the vehicle 10. The processor 120 receives the reservation information transmitted from the user terminal 200 and registers the scheduled entry time and the scheduled exit time included in the reservation information on the vehicle management information 170. As another example, the processor 120 may set a time after a predetermined time from the actual entry time as the scheduled exit time.

The entry/exit time information may further include history information. The history information indicates a history of the entry time and the exit time of the vehicle in the past.

The position information indicates the position of the vehicle 10 in the parking lot 1. Typically, the position information indicates a position or identification information of the parking space 5 in which vehicle 10 is parked. That is, the position information indicates the position or the identification information of the parking space allocated to the vehicle 10. When the vehicle 10 is traveling in the parking lot 1, the position information may indicate a traveling position of the vehicle 10. The current traveling position of the vehicle 10 is obtained by the localization processing performed by the vehicle 10. The processor 120 is able to acquire the information on the current traveling position from the vehicle 10 by communicating with the vehicle 10.

3. Utilization of Tentative Parking Space on Passage

Figure 4:
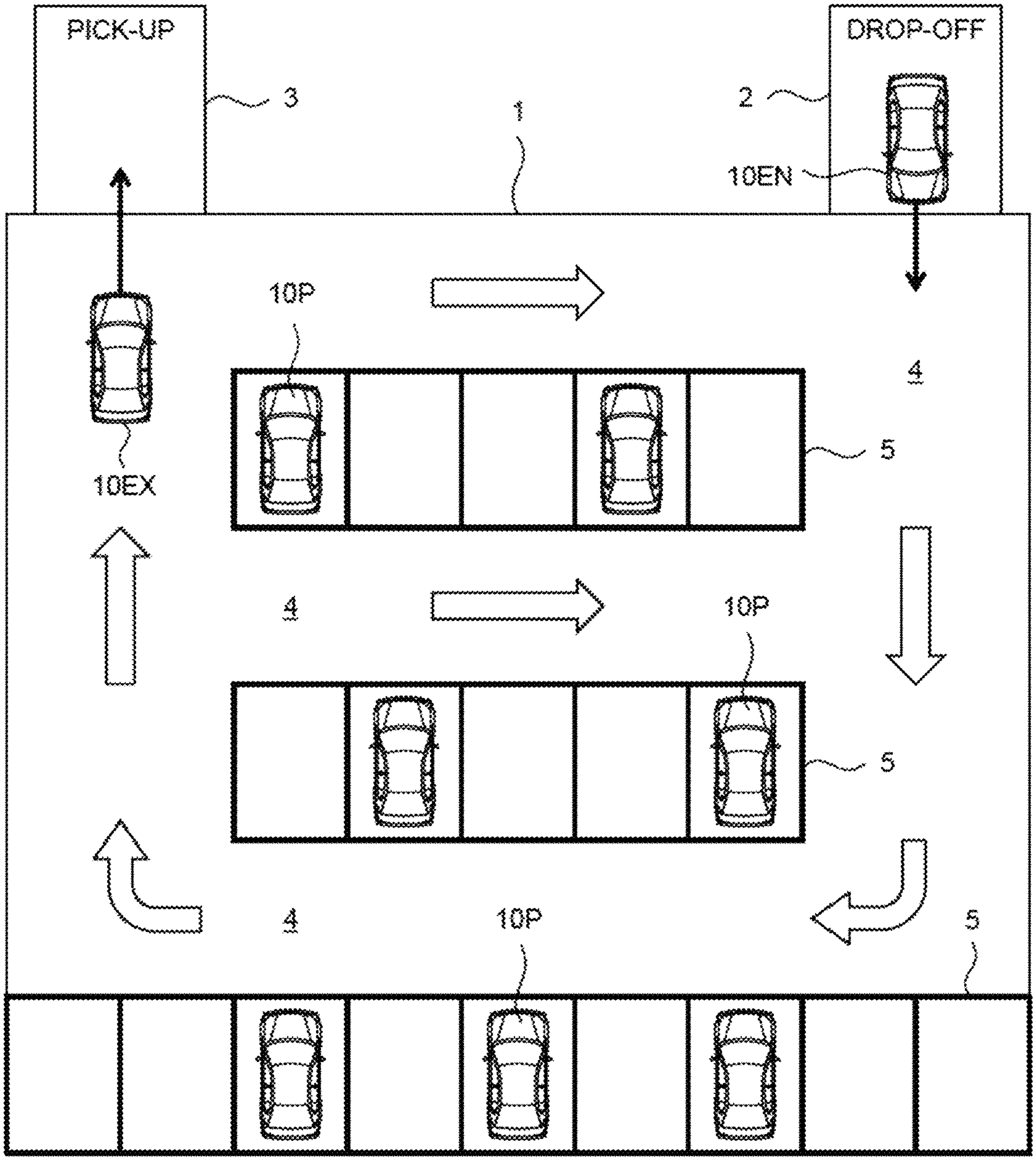
FIG. 4 is a diagram showing an example of a parking lot according to an embodiment of the present disclosure.

FIG. 4 shows an example of the parking lot 1. The parking lot 1 includes the drop-off area 2, the pick-up area 3, the passage 4, and the plurality of parking spaces 5. The passage 4 is an area in which the vehicle 10 travels. A traveling direction of the vehicle 10 on the passage 4 may be predetermined. The parking space 5, which is a space in which the vehicle 10 is parked, is predetermined. The parking lot map information 150 indicates the arrangement of the drop-off area 2, the pick-up area 3, the passage 4, and the parking spaces 5 in the parking lot 1. That is, the parking lot map information 150 indicates a positional relationship between the drop-off area 2, the pick-up area 3, the passage 4, and the parking spaces 5. The parking lot map information 150 may further indicate the predetermined traveling direction on the passage 4.

In the following description, the vehicle 10 that enters the parking lot 1 is referred to as an "entry vehicle 10EN," the vehicle 10 that exits the parking lot 1 is referred to as an "exit vehicle 10EX," and the vehicle 10 being parked in the parking space 5 is referred to as a "parked vehicle 10P." The entry vehicle 10EN moves from the drop-off area 2 to the allocated parking space 5. When parked in the allocated parking space 5, the entry vehicle 10EN becomes the parked vehicle 10P. When the parked vehicle 10P exits the parking lot 1, the parked vehicle 10P becomes the exit vehicle 10EX. The exit vehicle 10EX moves from the allocated parking space 5 to the pick-up area 3.

Figure 5:
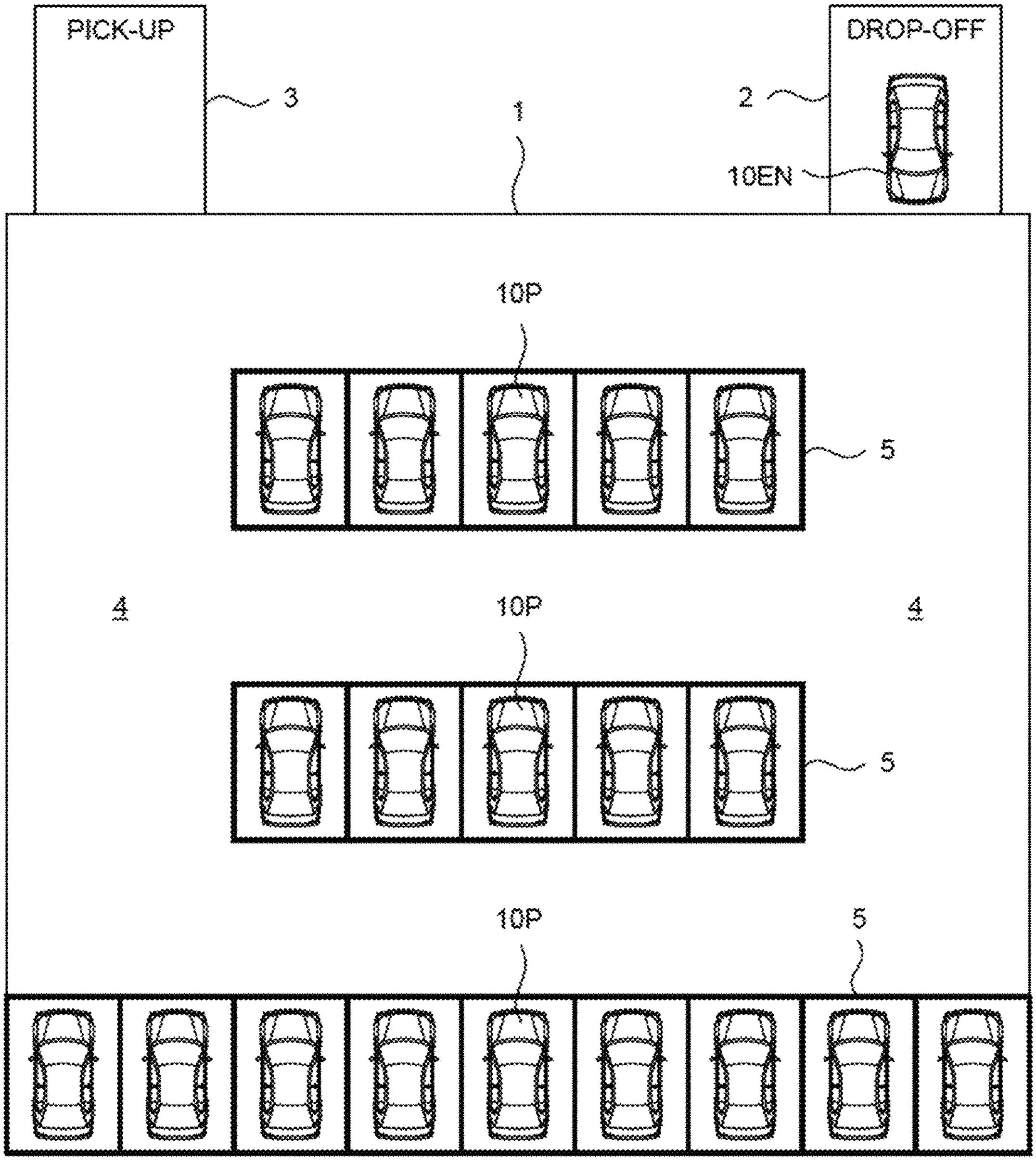
FIG. 5 is a diagram showing a state in which there is no available regular parking space in a parking lot according to an embodiment of the present disclosure.

FIG. 5 shows a state in which no parking space 5 in the parking lot 1 is available. The parked vehicles 10P are parked in all the parking spaces 5 in the parking lot 1, and there is no available parking space 5. Therefore, it is not possible to allocate any parking space 5 to a new entry vehicle 10EN.

Figure 6:
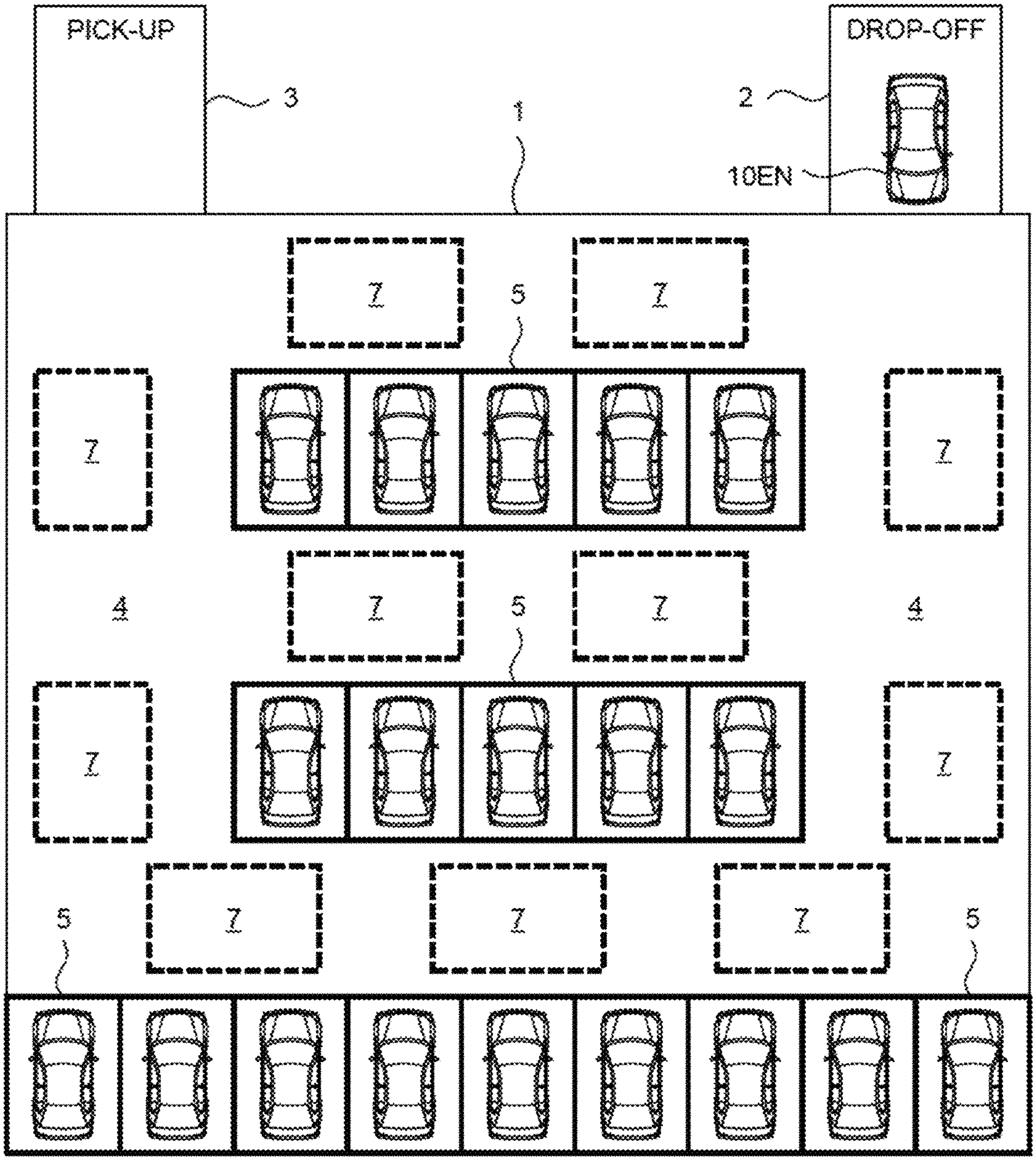
FIG. 6 is a conceptual diagram for explaining a tentative parking space in a parking lot according to an embodiment of the present disclosure.

According to the present embodiment, in order to further improve a utilization efficiency of the parking lot 1, a part of the passage 4 is utilized for parking if necessary. More specifically, as shown in FIG. 6, a "tentative parking space 7" is set on the passage 4. For convenience sake, a usual parking space 5 that is not present on the passage 4 is hereinafter referred to as a "regular parking space 5." The tentative parking space 7 has a size equivalent to that of the regular parking space 5, that is, a size that allows the vehicle 10 to be parked. A position of the tentative parking space 7 may be predetermined, or may be set each time the entry vehicle 10EN enters. It should be noted that the tentative parking space 7 does not necessarily need to be explicitly indicated by a partition line.

The parking lot map information 150 indicates not only the arrangement of the regular parking spaces 5 but also an arrangement of the tentative parking spaces 7. The parking lot usage information 160 indicates the usage status (availability) of the regular parking spaces 5 and the tentative parking spaces 7 in the parking lot 1.

At a time of entry of an entry vehicle 10EN, the processor 120 determines whether or not there is any available regular parking space 5 in the parking lot 1 based on the parking lot usage information 160. When there is an available regular parking space 5, the processor 120 allocates the available regular parking space 5 to the entry vehicle 10EN. On the other hand, when there is no available regular parking space 5, the processor 120 determines whether or not there is any available tentative parking space 7 on the passage 4 based on the parking lot usage information 160. When there is an available tentative parking space 7, the processor 120 allocates the available tentative parking space 7 to the entry vehicle 10EN. The process of allocating the tentative parking space 7 to the entry vehicle 10EN is hereinafter referred to as a "tentative allocation process."

As described above, according to the present embodiment, a part of the passage 4 is used as the tentative parking space 7 as necessary. As a result, the utilization efficiency of the parking lot 1 is improved.

4. Vehicle Position Control Process

Figure 7:
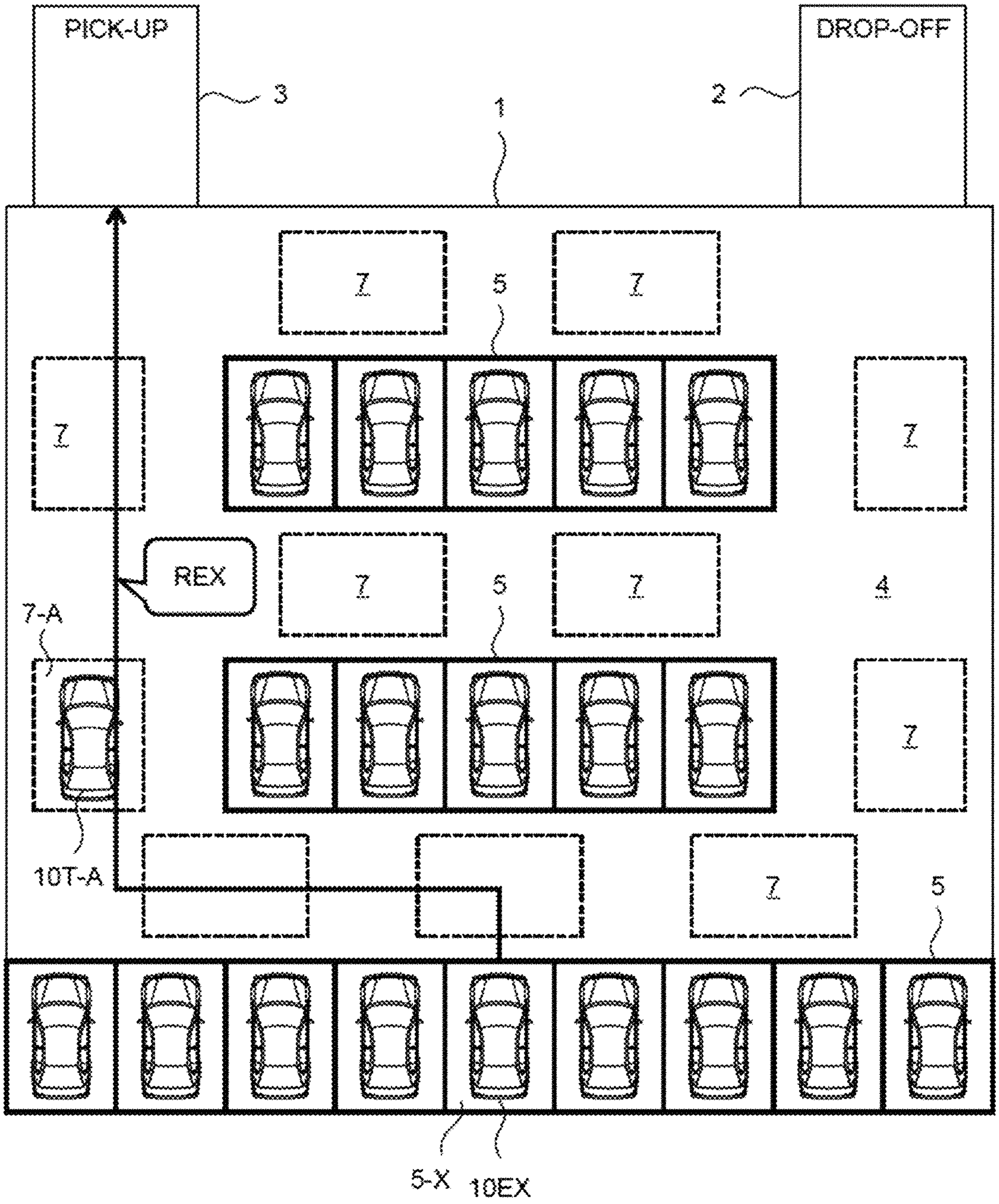
FIG. 7 is a conceptual diagram for explaining exiting of an exit vehicle according to an embodiment of the present disclosure.

FIG. 7 is a conceptual diagram for explaining exiting of an exit vehicle 10EX. In the example shown in FIG. 7, the exit vehicle 10EX has been parked in a regular parking space 5-X. An exit route REX, which is a route of the exit vehicle 10EX at the time of the exit, is from the regular parking space 5-X toward the pick-up area 3. The fact that the regular parking space 5-X is allocated to the exit vehicle 10EX is acquired from the vehicle management information 170 (the position information). Therefore, the processor 120 is able to calculate the exit route REX of the exit vehicle based on the parking lot map information 150 and the vehicle management information 170. The processor 120 makes the exit vehicle 10EX move along the exit route REX. That is, the processor 120 instructs the exit vehicle 10EX to move along the exit route REX. The exit vehicle 10EX moves from the regular parking space 5-X to the pick-up area 3 along the exit route REX.

However, there is a possibility that another vehicle 10 is parked in a tentative parking space 7 on the exit route REX of the exit vehicle 10EX. For convenience sake, the vehicle 10 parked in the tentative parking space 7 is hereinafter referred to as a "tentatively-parked vehicle 10T." In the example shown in FIG. 7, a first tentatively-parked vehicle 10T-A is parked in a first tentative parking space 7-A on the exit route REX of the exit vehicle 10EX. In this state, the first tentatively-parked vehicle 10T-A parked in the first tentative parking space 7-A may hinder the exiting of the exit vehicle 10EX.

In view of the above, according to the present embodiment, the processor 120 appropriately controls the position of the vehicle 10 in the parking lot 1 in order to secure the exit route REX of the exit vehicle 10EX. This process is hereinafter referred to as a "vehicle position control process." Typically, the processor 120 controls the position of the tentatively-parked vehicle 10T parked in the tentative parking space 7 in order to secure the exit route REX of the exit vehicle 10EX. The vehicle position control process is executed based on the parking lot map information 150 and the vehicle management information 170 (the position information of the vehicle 10) described above.

Hereinafter, various examples of the vehicle position control process according to the present embodiment will be described.

4-1. First Example

Figure 8:
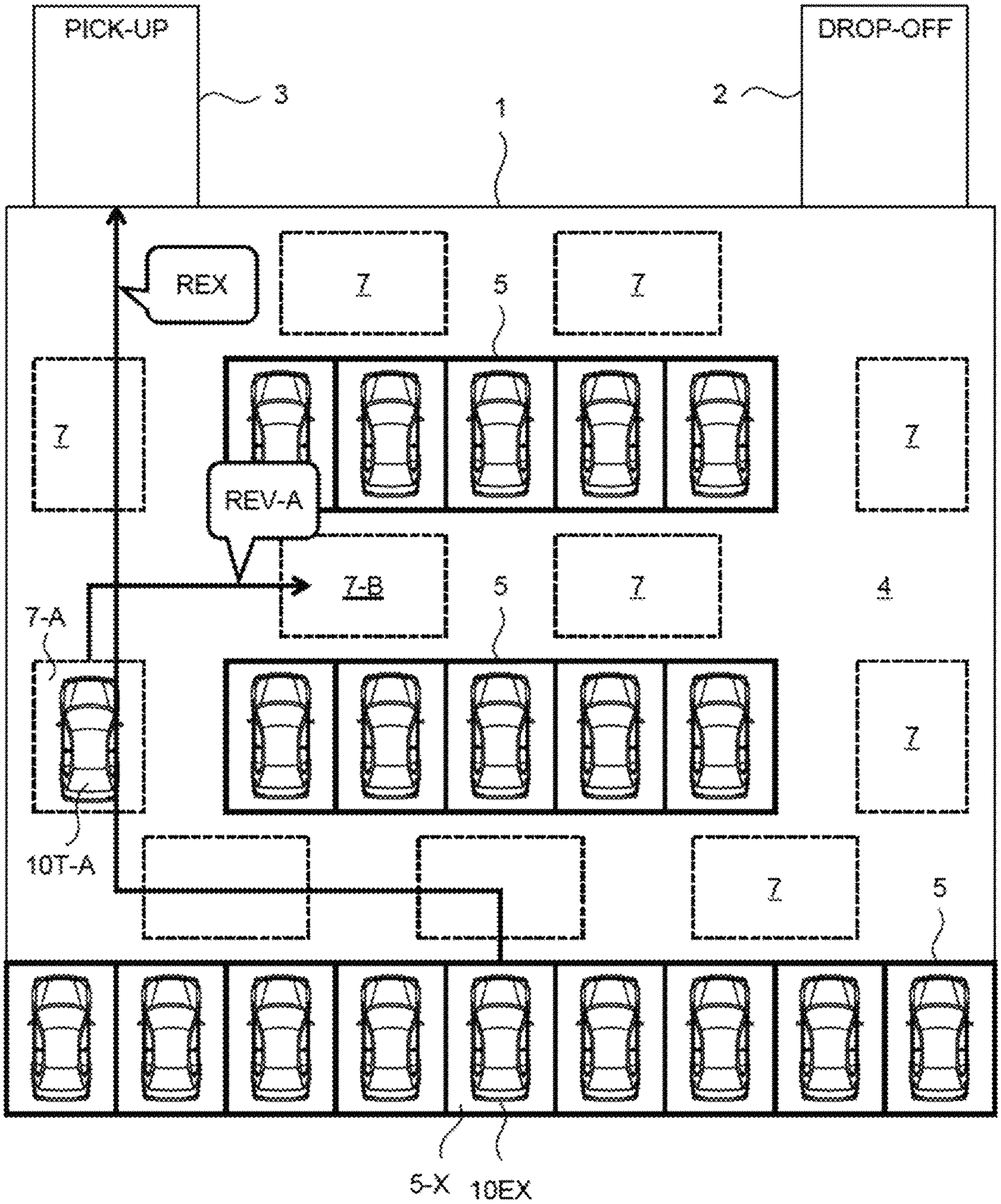
FIG. 8 is a conceptual diagram for explaining a first example of a vehicle position control process according to an embodiment of the present disclosure.

FIG. 8 is a conceptual diagram for explaining a first example of the vehicle position control process. A description overlapping with FIG. 7 will be omitted as appropriate. The processor 120 calculates the exit route REX of the exit vehicle 10EX based on the parking lot map information 150 and the vehicle management information 170. In addition, the processor 120 identifies the first tentatively-parked vehicle 10T-A parked in the first tentative parking space 7-A on the exit route REX, based on the exit route REX, the parking lot map information 150, and the vehicle management information 170. The fact that the first tentatively-parked vehicle 10T-A is parked in the first tentative parking space 7-A is acquired from the vehicle management information 170 (the position information).

Subsequently, the processor 120 determines a "first evacuation route REV-A" for evacuating the first tentatively-parked vehicle 10T-A so as not to hinder the exiting of the exit vehicle 10EX. Such the first evacuation route REV-A can be determined based on the exit route REX, the parking lot map information 150, and the vehicle management information 170 (the position information).

In the first example shown in FIG. 8, a destination of the first evacuation route REV-A is a tentative parking space 7-B that is not present on the exit route REX. That is, the first evacuation route REV-A is directed from the first tentative parking space 7-A on the exit route REX to the tentative parking space 7-B that is not present on the exit route REX. The processor 120 determines the first evacuation route REV-A such that the first tentatively-parked vehicle 10T-A moves from the first tentative parking space 7-A to the tentative parking space 7-B.

The processor 120 newly allocates the tentative parking space 7-B instead of the first tentative parking space 7-A to the first tentatively-parked vehicle 10T-A. Then, the processor 120 makes the first tentatively-parked vehicle 10T-A move along the first evacuation route REV-A. That is, the processor 120 instructs the first tentatively-parked vehicle 10T-A to move along the first evacuation route REV-A. The first tentatively-parked vehicle 10T-A moves from the first tentative parking space 7-A to the tentative parking space 7-B along the first evacuation route REV-A.

The processor 120 executes the exit process with respect to the exit vehicle and the vehicle position control process with respect to the first tentatively-parked vehicle 10T-A in conjunction with each other. Here, as long as the exit vehicle and the first tentatively-parked vehicle 10T-A do not interfere with each other, a movement start timing of the exit vehicle 10EX and a movement start timing of the first tentatively-parked vehicle 10T-A are arbitrary. For example, the first tentatively-parked vehicle 10T-A may first start moving, and then the exit vehicle 10EX may start moving later. As another example, the first tentatively-parked vehicle 10T-A and the exit vehicle 10EX may start moving at the same time.

4-2. Second Example

Figure 9:
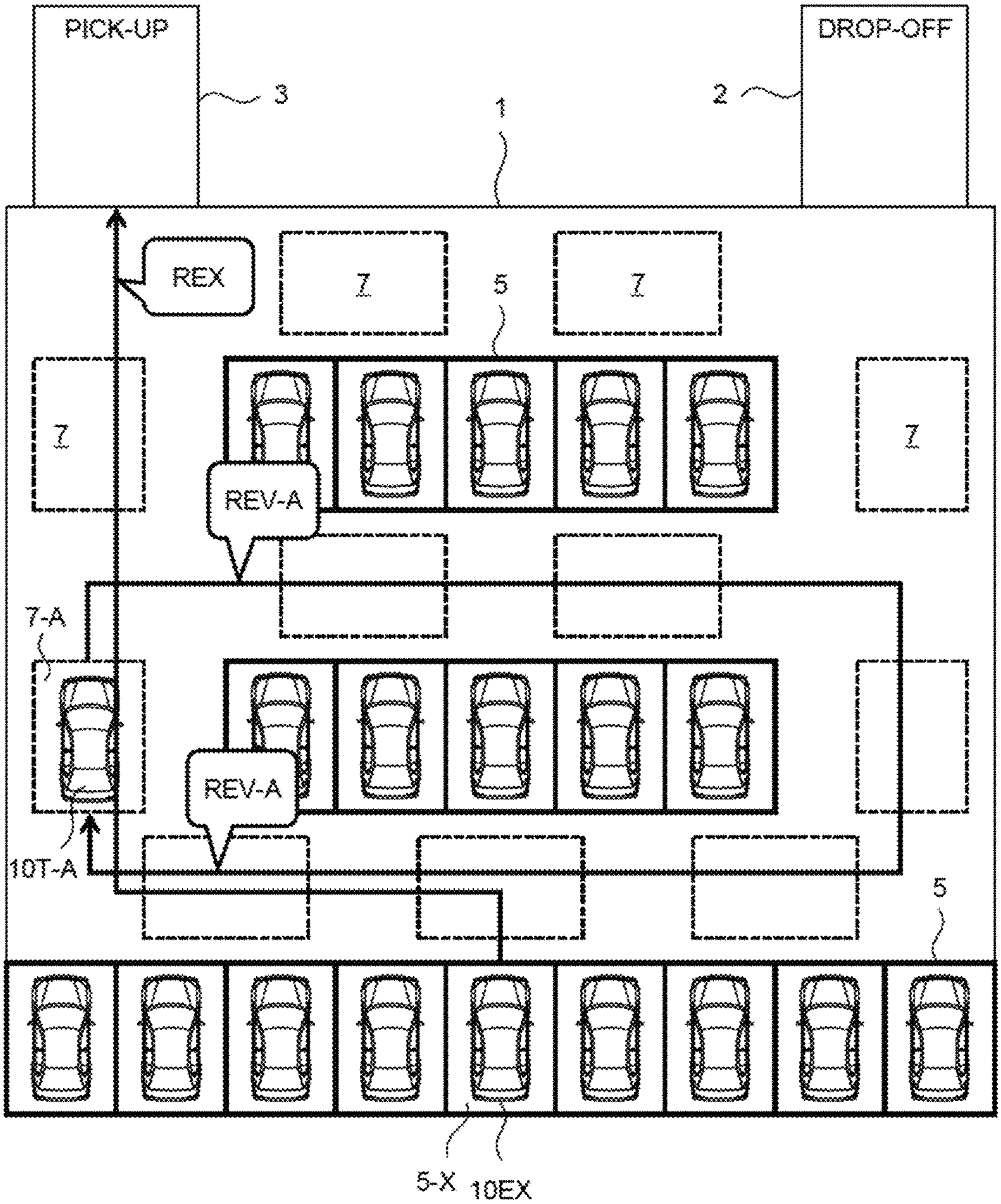
FIG. 9 is a conceptual diagram for explaining a second example of a vehicle position control process according to an embodiment of the present disclosure.

FIG. 9 is a conceptual diagram for explaining a second example of the vehicle position control process. The second example is a modification example of the first example described above. A description overlapping with the first example will be omitted as appropriate.

In the second example, a destination of the first evacuation route REV-A is the original first tentative parking space 7-A. That is, the processor 120 determines the first evacuation route REV-A such that the first tentatively-parked vehicle 10T-A moves from the first tentative parking space 7-A and returns back to the first tentative parking space 7-A again. Although the first tentative parking space 7-A which is the destination of the first evacuation route REV-A is present on the exit route REX, when the exit vehicle 10EX passes through the first tentative parking space 7-A while the first tentatively-parked vehicle 10T-A is moving, no interference occurs between the first tentatively-parked vehicle 10T-A and the exit vehicle 10EX.

According to the second example, it is not necessary to perform changing the tentative parking space 7 to be allocated to the first tentatively-parked vehicle 10T-A. Therefore, the processing load on the processor 120 is reduced.

4-3. Third Example

Figure 10:
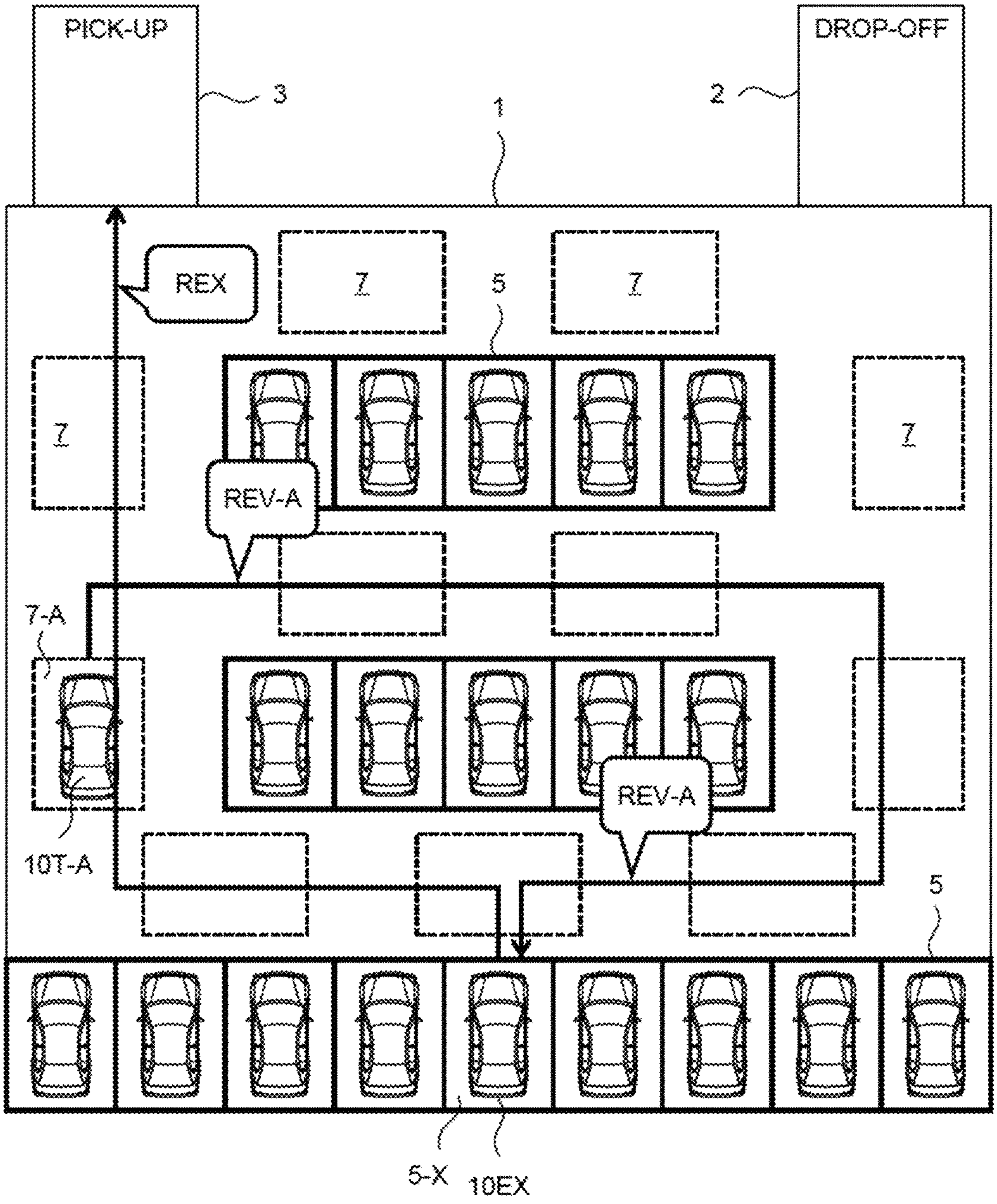
FIG. 10 is a conceptual diagram for explaining a third example of a vehicle position control process according to an embodiment of the present disclosure.

FIG. 10 is a conceptual diagram for explaining a third example of the vehicle position control process. The third example is a modification example of the first example described above. A description overlapping with the first example will be omitted as appropriate.

After the exit vehicle 10EX exits, the regular parking space 5-X that has been allocated to the exit vehicle 10EX becomes available. In the third example, a destination of the first evacuation route REV-A is the regular parking space 5-X that becomes available as a result of the exiting. That is, the first evacuation route REV-A is a route from the first tentative parking space 7-A to the regular parking space 5-X. The processor 120 determines the first evacuation route REV-A such that the first tentatively-parked vehicle 10T-A moves from the first tentative parking space 7-A to the regular parking space 5-X.

The processor 120 newly allocates the regular parking space 5-X instead of the first tentative parking space 7-A to the first tentatively-parked vehicle 10T-A. Then, the processor 120 makes the first tentatively-parked vehicle 10T-A move along the first evacuation route REV-A. At this time, the processor 120 makes the first tentatively-parked vehicle 10T-A move along the first evacuation route REV-A such that the first tentatively-parked vehicle 10T-A enters the regular parking space 5-X after the exit vehicle 10EX moves from the regular parking space 5-X. The first tentatively-parked vehicle 10T-A moves from the first tentative parking space 7-A along the first evacuation route REV-A and enters the regular parking space 5-X after the exit vehicle 10EX moves from the regular parking space 5-X.

According to the third example, the number of tentatively-parked vehicle 10T parked in the tentative parking space 7 is reduced. Therefore, a probability that exiting of another exit vehicle 10EX is hindered is reduced thereafter. As a result, the need for the vehicle position control process is also reduced. When the vehicle position control process is suppressed, not only fuel consumption accompanied by the vehicle position control process is reduced but also the processing load on the processor 120 is reduced. In addition, according to the third example, it is possible to collectively perform the exiting of the exit vehicle 10EX and the relocation of the first tentatively-parked vehicle which is efficient.

4-4. Fourth Example

Figure 11:
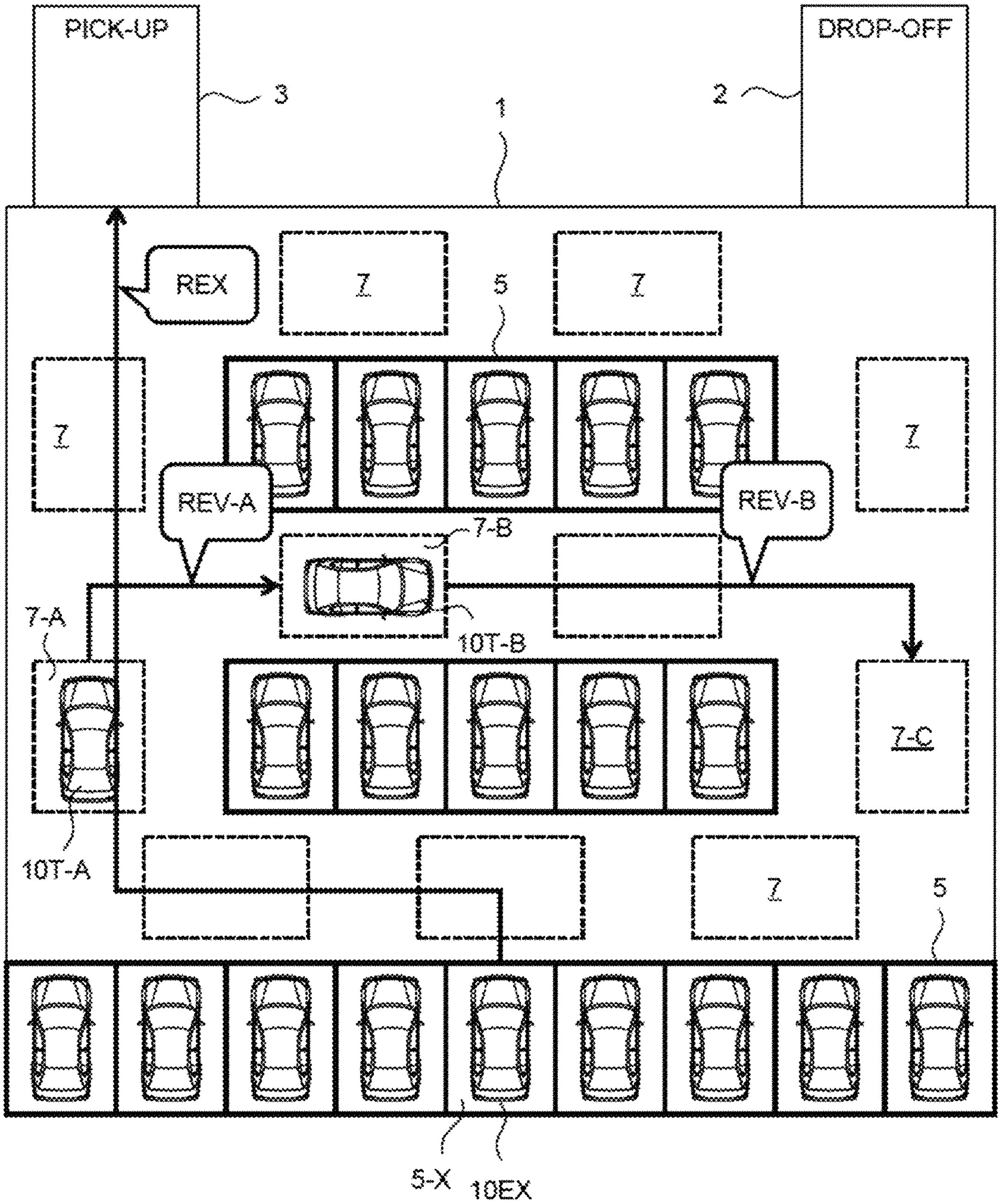
FIG. 11 is a conceptual diagram for explaining a fourth example of a vehicle position control process according to an embodiment of the present disclosure.

FIG. 11 is a conceptual diagram for explaining a fourth example of the vehicle position control process. The fourth example is a modification example of the first example described above. A description overlapping with the first example will be omitted as appropriate.

A second tentatively-parked vehicle 10T-B is parked in a second tentative parking space 7-B. The second tentative parking space 7-B is not present on the exit route REX of the exit vehicle 10EX but is present on the first evacuation route REV-A of the first tentatively-parked vehicle 10T-A. Therefore, the second tentatively-parked vehicle 10T-B may hinder the evacuation of the first tentatively-parked vehicle 10T-A. If the evacuation of the first tentatively-parked vehicle 10T-A is hindered, the exiting of the exit vehicle 10EX is also hindered resultantly. It can be said that the second tentatively-parked vehicle 10T-B which is not present on the exit route REX indirectly hinders the exiting of the vehicle 10EX.

In view of the above, according to the fourth example, the vehicle position control process is also performed with respect to the second tentatively-parked vehicle in order to achieve smooth evacuation of the first tentatively-parked vehicle 10T-A and smooth exiting of the exit vehicle 10EX.

More specifically, the processor 120 calculates the exit route REX of the exit vehicle 10EX and the first evacuation route REV-A of the first tentatively-parked vehicle 10T-A on the basis of the parking lot map information 150 and the vehicle management information 170. In addition, the processor 120 identifies the second tentatively-parked vehicle 10T-B parked in the second tentative parking space 7-B on the first evacuation route REV-A, based on the first evacuation route REV-A, the parking lot map information 150, and the vehicle management information 170. The fact that the second tentatively-parked vehicle 10T-B is parked in the second tentative parking space 7-B is acquired from the vehicle management information 170 (the position information).

Subsequently, the processor 120 determines a "second evacuation route REV-B" for evacuating the second tentatively-parked vehicle 10T-B. The second evacuation route REV-B is determined so as not to hinder the evacuation of the first tentatively-parked vehicle 10T-A and the exiting of the exit vehicle 10EX. Such the second evacuation route REV-B can be determined based on the exit route REX, the first evacuation route REV-A, the parking lot map information 150, and the vehicle management information 170 (the position information).

In the fourth example shown in FIG. 11, a destination of the second evacuation route REV-B is a tentative parking space 7-C that is not present on the exit route REX and the first evacuation route REV-A. That is, the second evacuation route REV-B is directed from the second tentative parking space 7-B on the first evacuation route REV-A to the tentative parking space 7-C that is not present on the first evacuation route REV-A. The processor 120 determines the second evacuation route REV-B such that the second tentatively-parked vehicle 10T-B moves from the second tentative parking space 7-B to the tentative parking space 7-C.

The processor 120 newly allocates the tentative parking space 7-C instead of the second tentative parking space 7-B to the second tentatively-parked vehicle 10T-B. Then, the processor 120 makes the second tentatively-parked vehicle 10T-B move along the second evacuation route REV-B. That is, the processor 120 instructs the second tentatively-parked vehicle 10T-B to move along the second evacuation route REV-B. The second tentatively-parked vehicle 10T-B moves from the second tentative parking space 7-B to the tentative parking space 7-C along the second evacuation route REV-B.

The processor 120 executes the exit process with respect to the exit vehicle 10EX and the vehicle position control processes with respect to the first tentatively-parked vehicle 10T-A and the second tentatively-parked vehicle 10T-B in conjunction with each other. Here, as long as the exit vehicle 10EX, the first tentatively-parked vehicle 10T-A, and the second tentatively-parked vehicle 10T-B do not interfere with each other, a movement start timing of the exit vehicle 10EX and movement start timings of the first tentatively-parked vehicle 10T-A and the second tentatively-parked vehicle 10T-B are arbitrary. For example, the second tentatively-parked vehicle 10T-B may start moving first, the first tentatively-parked vehicle 10T-A may start moving next, and the exit vehicle 10EX may start moving last. As another example, the second tentatively-parked vehicle 10T-B, the first tentatively-parked vehicle 10T-A, and the exit vehicle 10EX may start moving at the same time.

For example, a combination of the first example and the fourth example of the vehicle position control process is possible.

4-5. Fifth Example

Figure 12:
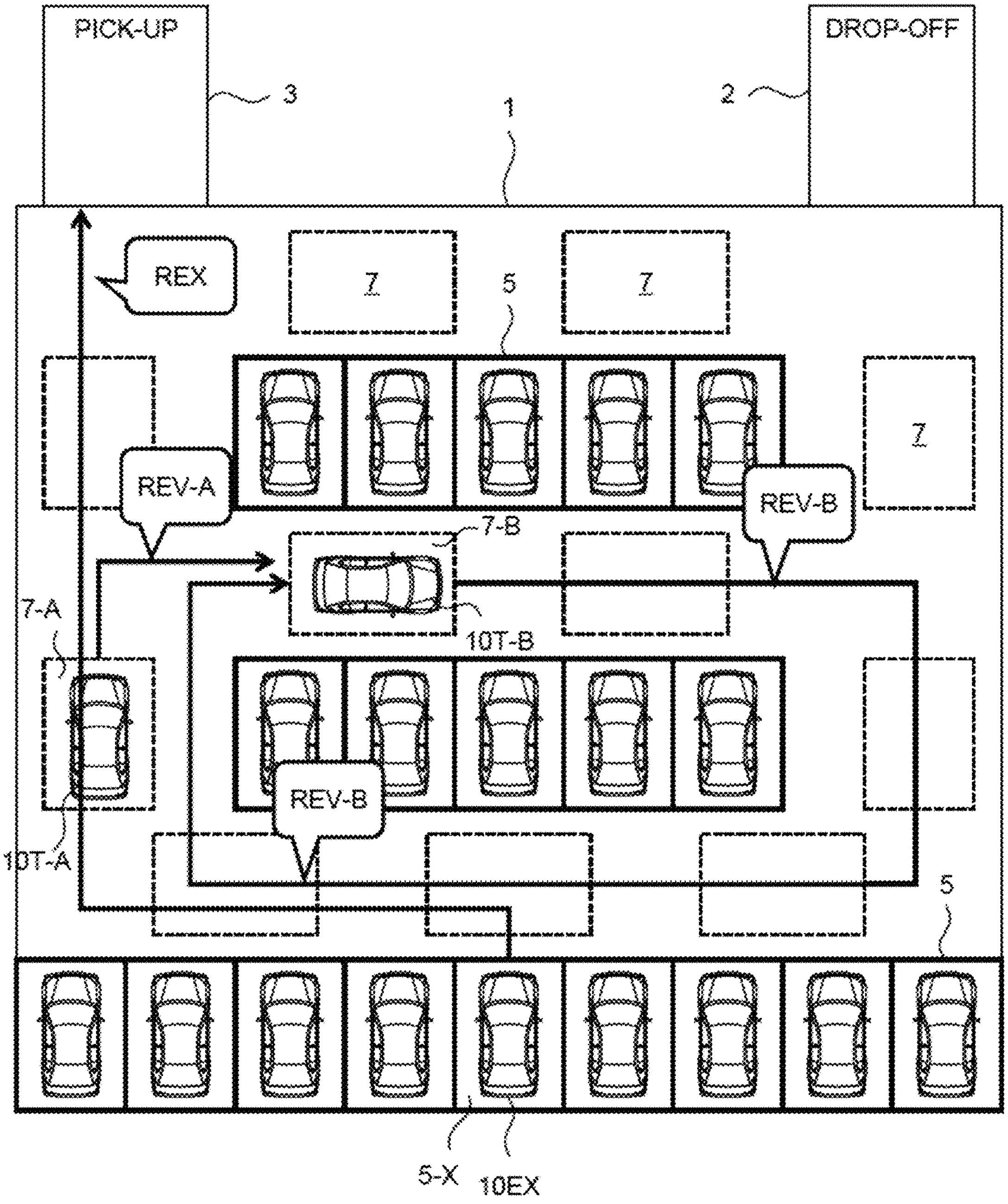
FIG. 12 is a conceptual diagram for explaining a fifth example of a vehicle position control process according to an embodiment of the present disclosure.

FIG. 12 is a conceptual diagram for explaining a fifth example of the vehicle position control process. The fifth example is a modification example of the fourth example described above. A description overlapping with the fourth example will be omitted as appropriate.

In the fifth example, a destination of the second evacuation route REV-B is the original second tentative parking space 7-B. That is, the processor 120 determines the second evacuation route REV-B such that the second tentatively-parked vehicle 10T-B moves from the second tentative parking space 7-B and returns back to the second tentative parking space 7-B. Although the second tentative parking space 7-B which is the destination of the second evacuation route REV-B is present on the first evacuation route REV-A, when the first tentatively-parked vehicle 10T-A passes through the second tentative parking space 7-B while the second tentatively-parked vehicle 10T-B is moving, no interference occurs between the first tentatively-parked vehicle 10T-A and the second tentatively-parked vehicle 10T-B.

According to the fifth example, it is not necessary to perform changing the tentative parking space 7 to be allocated to the second tentatively-parked vehicle 10T-B. Therefore, the processing load on the processor 120 is reduced.

For example, a combination of the second example and the fifth example of the vehicle position control process is possible. Further, a combination of the third example and the fifth example of the vehicle position control process is also possible.

4-6. Sixth Example

Figure 13:
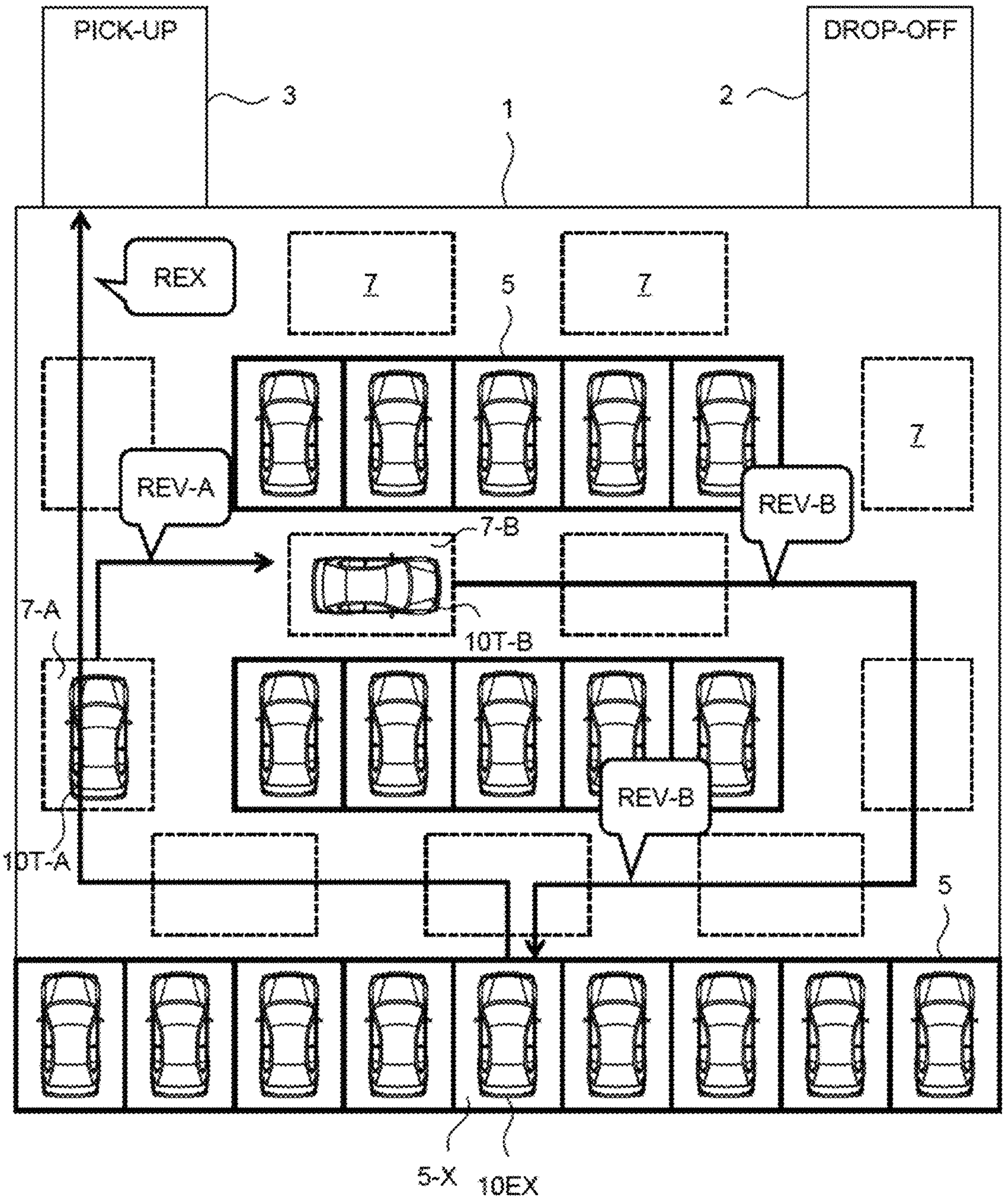
FIG. 13 is a conceptual diagram for explaining a sixth example of a vehicle position control process according to an embodiment of the present disclosure.

FIG. 13 is a conceptual diagram for explaining a sixth example of the vehicle position control process. The sixth example is a modification example of the fourth example described above. A description overlapping with the fourth example will be omitted as appropriate.

After the exit vehicle 10EX exits, the regular parking space 5-X that has been allocated to the exit vehicle 10EX becomes available. In the sixth example, a destination of the second evacuation route REV-B is the regular parking space 5-X that becomes available as a result of exiting. That is, the second evacuation route REV-B is a route from the second tentative parking space 7-B to the regular parking space 5-X. The processor 120 determines the second evacuation route REV-B such that the second tentatively-parked vehicle 10T-B moves from the second tentative parking space 7-B to the regular parking space 5-X.

The processor 120 newly allocates the regular parking space 5-X instead of the second tentative parking space 7-B to the second tentatively-parked vehicle 10T-B. Then, the processor 120 makes the second tentatively-parked vehicle 10T-B move along the second evacuation route REV-B. At this time, the processor 120 makes the second tentatively-parked vehicle 10T-B move along the second evacuation route REV-B such that the second tentatively-parked vehicle 10T-B enters the regular parking space 5-X after the exit vehicle 10EX moves from the regular parking space 5-X. The second tentatively-parked vehicle 10T-B moves from the second tentative parking space 7-B along the second evacuation route REV-B and enters the regular parking space 5-X after the exit vehicle 10EX moves from the regular parking space 5-X.

According to the sixth example, the number of tentatively-parked vehicle 10T parked in the tentative parking space 7 is reduced. Therefore, a probability that exiting of another exit vehicle 10EX is hindered is reduced thereafter. As a result, the need for the vehicle position control process is also reduced. When the vehicle position control process is suppressed, not only fuel consumption accompanied by the vehicle position control process is reduced but also the processing load on the processor 120 is reduced. In addition, according to the sixth example, it is possible to collectively perform the exiting of the exit vehicle 10EX and the relocation of the second tentatively-parked vehicle 10T-B, which is efficient.

For example, a combination of the first example and the sixth example of the vehicle position control process is possible. Further, a combination of the second example and the sixth example of the vehicle position control process is also possible.

4-7. Processing Flow

Figure 14:
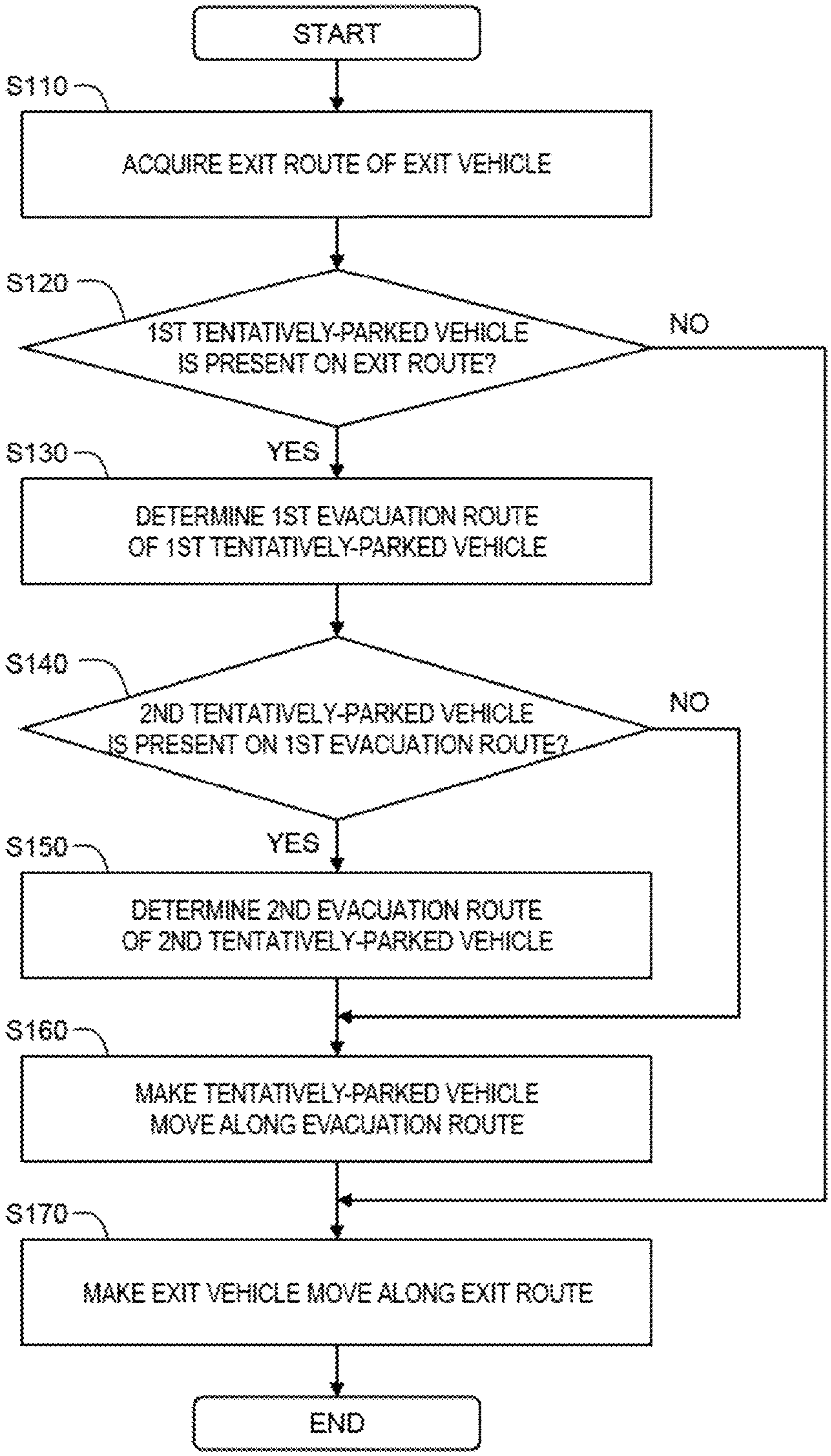
FIG. 14 is a flowchart showing processing related to a vehicle position control process according to an embodiment of the present disclosure.

FIG. 14 is a flowchart showing processing related to the vehicle position control process according to the present embodiment.

In Step S110, the processor 120 acquires the exit route REX of the exit vehicle 10EX based on the parking lot map information 150 and the vehicle management information 170.

In Step S120, the processor 120 determines whether or not a first tentatively-parked vehicle 10T-A is present on the exit route REX based on the exit route REX, the parking lot map information 150, and the vehicle management information 170. When the first tentatively-parked vehicle 10T-A is present on the exit route REX, that is, when the first tentatively-parked vehicle 10T-A parked in the first tentative parking space 7-A on the exit route REX is identified (Step S120; Yes), the processing proceeds to Step S130. Otherwise (Step S120; No), the processing proceeds to Step S170.

In Step S130, the processor 120 determines the first evacuation route REV-A for evacuating the first tentatively-parked vehicle 10T-A so as not to hinder the exiting of the exit vehicle 10EX. Such the first evacuation route REV-A can be determined based on the exit route REX, the parking lot map information 150, and the vehicle management information 170.

In Step S140, the processor 120 determines whether or not a second tentatively-parked vehicle 10T-B is present on the first evacuation route REV-A based on the first evacuation route REV-A, the parking lot map information 150, and the vehicle management information 170. When the second tentatively-parked vehicle 10T-B is present on the first evacuation route REV-A, that is, when the second tentatively-parked vehicle 10T-B parked in the second tentative parking space 7-B on the first evacuation route REV-A is identified (Step S140; Yes), the processing proceeds to Step S150. Otherwise (Step S140; No), the processing proceeds to Step S160.

In Step S150, the processor 120 determines the second evacuation route REV-B for evacuating the second tentatively-parked vehicle 10T-B. The second evacuation route REV-B is determined so as not to hinder the evacuation of the first tentatively-parked vehicle 10T-A and the exiting of the exit vehicle 10EX. Such the second evacuation route REV-B can be determined based on the exit route REX, the first evacuation route REV-A, the parking lot map information 150, and the vehicle management information 170.

In Step S160, the processor 120 makes the tentatively-parked vehicle 10T move along the evacuation route REV. That is, the processor 120 instructs the tentatively-parked vehicle 10T to move along the evacuation route REV.

In Step S170, the processor 120 makes the exit vehicle 10EX move along the exit route REX. That is, the processor 120 instructs the exit vehicle 10EX to move along the exit route REX. It should be noted that timings of Step S160 and Step S170 are arbitrary as long as no interference occurs between the exit vehicle 10EX and the tentatively-parked vehicle 10T.

4-8. Effects

As described above, when the exit vehicle 10EX exits the parking lot 1, the tentatively-parked vehicle 10T is evacuated so as not to hinder the exiting of the exit vehicle 10EX. As a result, it is possible to secure the exit route REX of the exit vehicle 10EX and to make the exit vehicle 10EX exit smoothly. In particular, it is possible to effectively secure the exit route REX of the exit vehicle 10EX by evacuating not only the first tentatively-parked vehicle 10T-A on the exit route REX but also the second tentatively-parked vehicle 10T-B that is not located on the exit route REX but is located on the first evacuation route REV-A of the first tentatively-parked vehicle 10T-A.

The destination of the evacuation route REV of the tentatively-parked vehicle may be the original tentative parking space 7. In this case, it is not necessary to perform changing the tentative parking space 7 to be allocated to the tentatively-parked vehicle 10T, and thus the processing load on the processor 120 is reduced.

The destination of the evacuation route REV of the tentatively-parked vehicle may be the regular parking space 5-X that has been allocated to the exit vehicle 10EX. In this case, the number of tentatively-parked vehicle 10T parked in the tentative parking space 7 is reduced, and thus the probability that exiting of another exit vehicle 10EX is hindered is reduced thereafter. When the vehicle position control process is suppressed, not only the fuel consumption accompanied by the vehicle position control process is reduced but also the processing load on the processor 120 is reduced.

5. Tentative Allocation Process

As described above, at the time of the entry of the entry vehicle 10EN, the processor 120 determines whether or not there is any available regular parking space 5 in the parking lot 1. When there is no available regular parking space 5, the processor 120 executes the "tentative allocation process" that allocates the tentative parking space 7 to the entry vehicle 10EN. However, allocating the tentative parking space 7 without any plan causes an increase in probability that the tentatively-parked vehicle 10T parked in the tentative parking space 7 on the passage 4 hinders the exiting of the exit vehicle 10EX. In other words, a probability that the vehicle position control process described in the above Section 4 is required increases.

It is desirable to suppress the vehicle position control process from viewpoints of reduction in fuel consumption accompanied by the vehicle position control process, reduction in the processing load on the processor 120, and the like. In view of the above, another feature of the tentative allocation process for reducing the probability that the exiting of the exit vehicle 10EX is hindered and thus suppressing the vehicle position control process will be described hereinafter.

5-1. Suppression of Vehicle Position Control Process

Figure 15:
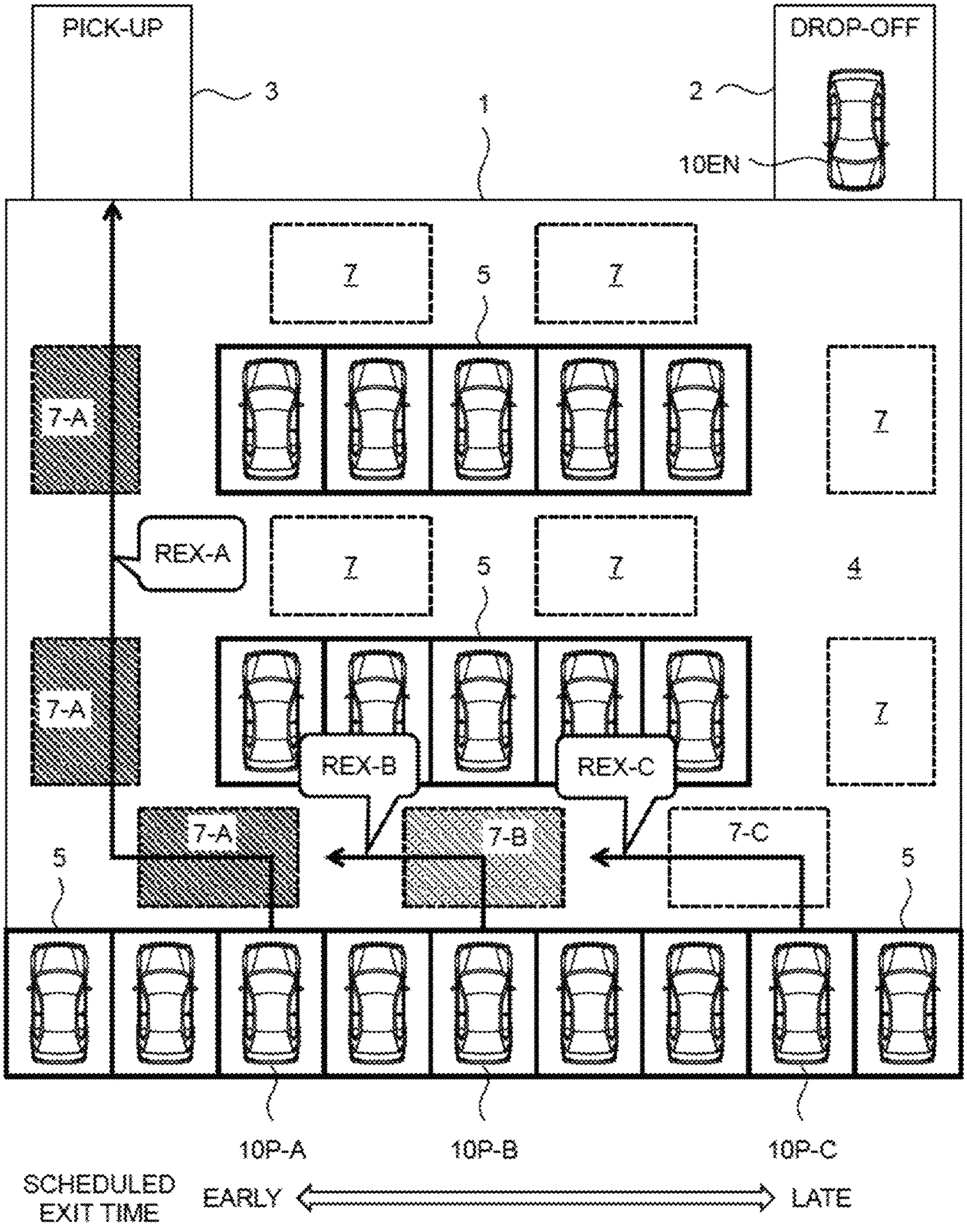
FIG. 15 is a conceptual diagram for explaining a feature of a tentative allocation process according to an embodiment of the present disclosure.

FIG. 15 is a conceptual diagram for explaining a feature of the tentative allocation process according to the present embodiment. Based on the vehicle management information 170, the processor 120 acquires the scheduled exit time of the parked vehicle 10P already parked in the regular parking space 5.

In the example shown in FIG. 15, three parked vehicles 10P-A, 10P-B, and are considered. It is assumed that the scheduled exit time of the parked vehicle is the earliest and the scheduled exit time of the parked vehicle 10P-C is the latest among the three vehicles. An exit route REX-A is the exit route REX assumed when the parked vehicle 10P-A exits. An exit route REX-B is the exit route REX assumed when the parked vehicle 10P-B exits. An exit route REX-C is the exit route REX assumed when the parked vehicle 10P-C exits.

A tentative parking space 7-A exists at least on the exit route REX-A of the parked vehicle 10P-A. A tentative parking space 7-B does not exist on the exit route REX-A but exists at least on the exit route REX-B of the parked vehicle 10P-B. A tentative parking space 7-C does not exist on the exit routes REX-A and REX-B but exists on the exit route REX-C of the parked vehicle 10P-C.

First, a case where the tentative parking space 7-C is allocated to the entry vehicle 10EN and the entry vehicle 10EN is parked in the tentative parking space 7-C is considered. The tentatively-parked vehicle 10T parked in the tentative parking space 7-C does not hinder the exiting of the parked vehicles 10P-A and 10P-B. After the parked vehicle 10P-A or 10P-B exits, the regular parking space 5 becomes available. Since the parked vehicle 10P-C is scheduled to exit after the parked vehicles 10P-A and exit, it is also possible to relocate the tentatively-parked vehicle 10T parked in the tentative parking space 7-C to the available regular parking space 5 before the parked vehicle 10P-C exits. After the tentative parking space 7-C is vacant, the exiting of the parked vehicle 10P-C is not hindered. In this manner, allocating the tentative parking space 7-C to the entry vehicle 10EN makes it possible to reduce the probability that the exiting of the parked vehicle 10P is hindered.

Next, another case where the tentative parking space 7-A is allocated to the entry vehicle 10EN and the entry vehicle 10EN is parked in the tentative parking space 7-A is considered. In this case, the tentatively-parked vehicle 10T parked in the tentative parking space 7-A hinders the exiting of the parked vehicle 10P-A. Since the scheduled exit time of the parked vehicle 10P-A is early, the regular parking space 5 is less likely to become available by that time, and thus relocating the tentatively-parked vehicle 10T parked in the tentative parking space 7-C is less likely to be possible. In this manner, if the tentative parking space 7-A is allocated to the entry vehicle 10EN, the probability that the exiting of the parked vehicle 10P-A is hindered increases.

In view of the above, the processor 120 sets a priority of the tentative parking spaces 7 based on the scheduled exit time of the parked vehicle 10P and the exit route REX. In the example shown in FIG. 15, the scheduled exit time of the parked vehicle is the earliest, and the priority of the tentative parking space 7-A present on the exit route REX-A is set to be lowest. Conversely, the priority of the tentative parking spaces 7-B and 7-C that are not present on the exit route REX-A is set to be high.

The priority with regard to the tentative parking spaces 7-B and 7-C is as follows. The scheduled exit time of the parked vehicle 10P-B is relatively early, and the priority of the tentative parking space 7-B present on the exit route REX-B is set to be relatively low. Conversely, the priority of the tentative parking space 7-C that is not present on the exit route REX-B is set to be relatively high. That is, the priority is in an order of the tentative parking spaces 7-C, 7-B, and 7-A.

The above can be generalized as follows. A scheduled exit time of a first parked vehicle 10P-1 is earlier than a scheduled exit time of a second parked vehicle 10P-2. In this case, the processor 120 identifies a tentative parking space 7 that is not present on an exit route REX-1 of the first parked vehicle 10P-1. Then, the processor 120 preferentially allocates the tentative parking space 7 not present on the exit route REX-1 to the entry vehicle 10EN.

It should be noted that "preferentially allocating the tentative parking space 7 not present on the exit route REX-1" does not mean invariably allocating the tentative parking space 7 not present on the exit route REX-1. When there is no available tentative parking space 7 that is not present on the exit route REX-1, a tentative parking space 7 that is present on the exit route REX-1 may be allocated. In the example shown in FIG. 15, when the tentative parking space 7-C is available, the tentative parking space 7-C is allocated. If the tentative parking space 7-C is not available, the tentative parking space 7-B is allocated. If neither the tentative parking space 7-C nor the tentative parking space 7-B is available, the tentative parking space 7-A is allocated.

The exit route REX-1 of the first parked vehicle 10P-1 is calculated based on the regular parking space 5 in which the first parked vehicle 10P-1 is parked and the parking lot map information 150. The regular parking space 5 in which the first parked vehicle 10P-1 is parked is acquired from the vehicle management information 170 (the position information). The tentative parking space 7 that is not present on the exit route REX-1 can be specified based on the exit route REX-1 and the parking lot map information 150. Therefore, the processor 120 is able to specify the tentative parking space 7 not present on the exit route REX-1 of the first parked vehicle 10P-1 based on the parking lot map information 150 and the vehicle management information 170. Then, the processor 120 preferentially allocates the tentative parking space 7 not present on the exit route REX-1 to the entry vehicle 10EN. As a result, it is possible to reduce the probability that the tentatively-parked vehicle 10T parked in the tentative parking space 7 hinders the exiting of the exit vehicle 10EX.

5-2. Method of Acquiring Scheduled Exit Time

Next, examples of a method of acquiring the scheduled exit time of the parked vehicle 10P parked in the regular parking space 5 will be described.

In a first example, the scheduled exit time specified by the user is used. More specifically, at the time of reservation of the automated valet parking service, the scheduled exit time is specified by the user. The processor 120 receives the reservation information transmitted from the user terminal 200 and registers the scheduled exit time included in the reservation information on the vehicle management information 170. Then, the processor 120 acquires the scheduled exit time specified by the user from the vehicle management information 170.

In a second example, the scheduled exit time is predicted (estimated) based on an entry time at which the parked vehicle 10P enters the parking lot 1. More specifically, after the entry of the entry vehicle 10EN is completed, the processor 120 registers an actual entry time on the vehicle management information 170. The processor 120 acquires the actual entry time of the parked vehicle 10P from the vehicle management information 170. Then, the processor 120 predicts that the scheduled exit time is earlier as the actual entry is earlier. For example, the processor 120 predicts a time after a predetermined time from the actual entry time as the scheduled exit time.

In a third example, the history information included in the vehicle management information 170 is used. The history information indicates a history of a past entry time and a past exit time of the parked vehicle 10P. The processor 120 statistically estimates the scheduled exit time based on the history of the past exit time of the parked vehicle 10P. For example, the processor 120 estimates an average value of past exit times as the scheduled exit time. As another example, when a dispersion of the past exit times is less than a threshold value, the processor 120 may estimate an average value of the past exit times as the scheduled exit time. The third example is effective in a case where the automated valet parking is used in commuting or the like and a daily exit time is determined to some extent.

5-3. Effects

As described above, according to the present embodiment, the tentative allocation process that allocates the tentative parking space 7 to the entry vehicle 10EN includes the characteristic process. More specifically, the scheduled exit time of the parked vehicle 10P parked in the regular parking space 5 is acquired. When the scheduled exit time of the first parked vehicle 10P-1 is earlier than the scheduled exit time of the second parked vehicle 10P-2, the tentative parking space 7 not present on the exit route REX-1 of the first parked vehicle 10P-1 is preferentially allocated to the entry vehicle 10EN. That is, the tentative parking space 7 is allocated to the entry vehicle so as to avoid the exit route REX-1 of the first parked vehicle 10EN-1 having the earlier scheduled exit time as much as possible.

As a result, it is possible to reduce the probability that the tentatively-parked vehicle 10T parked in the tentative parking space 7 hinders the exiting of the exit vehicle 10EX. Since the probability that the exiting of the exit vehicle 10EX is hindered is reduced, the probability that the vehicle position control process described in the above Section 4 is required decreases. When the vehicle position control process is suppressed, not only the fuel consumption accompanied by the vehicle position control process is reduced but also the processing load on the processor 120 is reduced.

6. Reallocation Process

When a parked vehicle 10P parked in a regular parking space 5 exits, the regular parking space 5 becomes available. When any regular parking space 5 becomes available while the tentative parking space 7 is in use, the processor 120 may newly allocate the available regular parking space 5 to any vehicle 10. This process is hereinafter referred to as a "reallocation process" or a "relocation process." Hereinafter, various examples of the reallocation process (relocation process) will be described.

6-1. First Example

Figure 16:
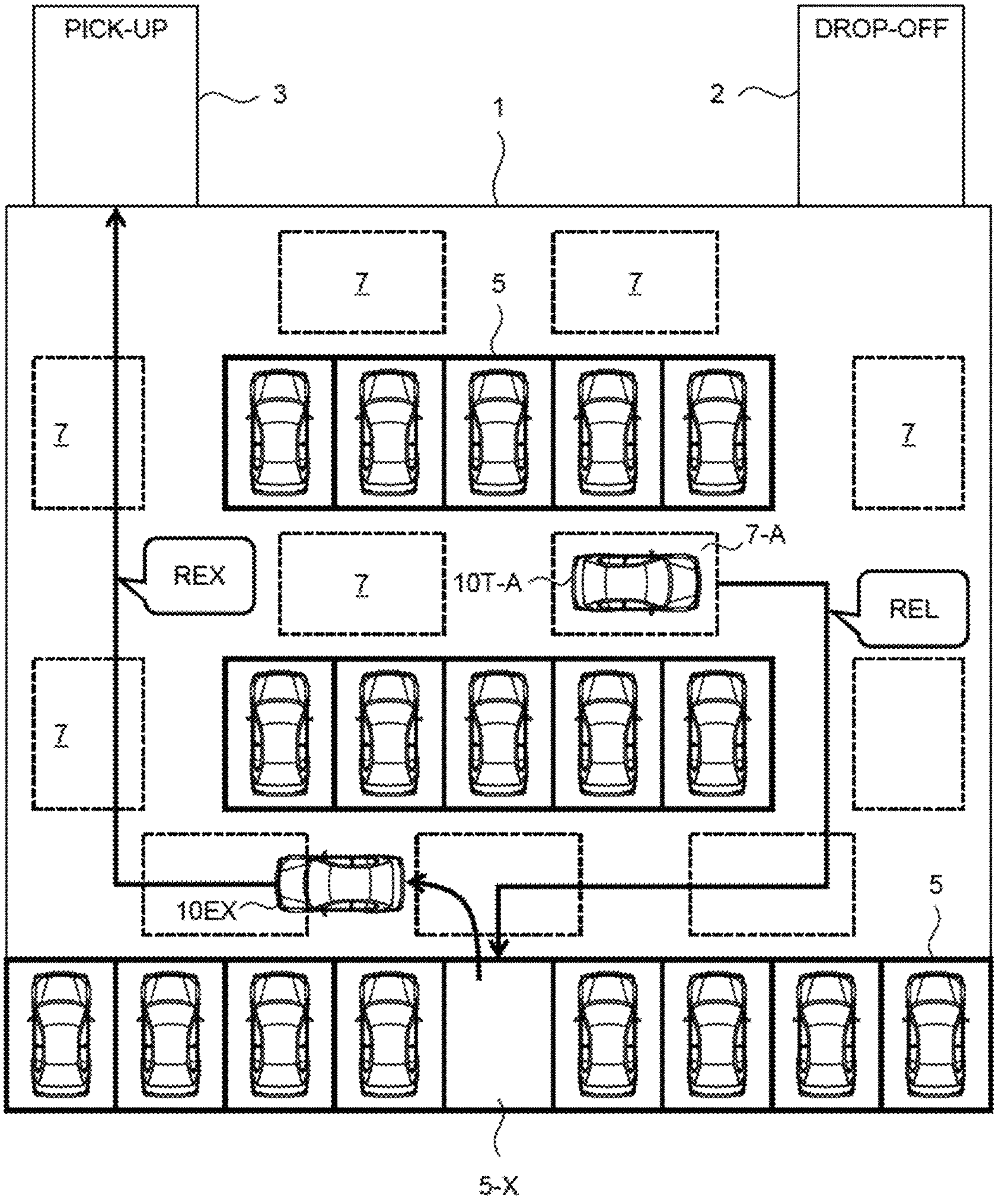
FIG. 16 is a conceptual diagram for explaining a first example of a reallocation process according to an embodiment of the present disclosure.

FIG. 16 is a conceptual diagram for explaining a first example of the reallocation process. In the first example, a tentatively-parked vehicle 10T-A is parked in a tentative parking space 7-A. Thereafter, a regular parking space 5-X becomes available. The processor 120 newly allocates the available regular parking space 5-X to the tentatively-parked vehicle 10T-A parked in the tentative parking space 7-A.

In addition, the processor 120 instructs the tentatively-parked vehicle 10T-A to move from the tentative parking space 7-A to the regular parking space 5-X. For example, the processor 120 generates a relocation route REL from the tentative parking space 7-A to the regular parking space 5-X based on the parking lot map information 150. Then, the processor 120 instructs the tentatively-parked vehicle 10T-A to move along the relocation route REL. The tentatively-parked vehicle 10T-A moves from the tentative parking space 7-A to the regular parking space 5-X along the relocation route REL According to the first example, the number of tentatively-parked vehicles 10T parked in the tentative parking spaces 7 is reduced. Therefore, the probability that the tentatively-parked vehicle 10T hinders the exiting of the exit vehicle 10EX is reduced.

6-2. Second Example

Figure 17:
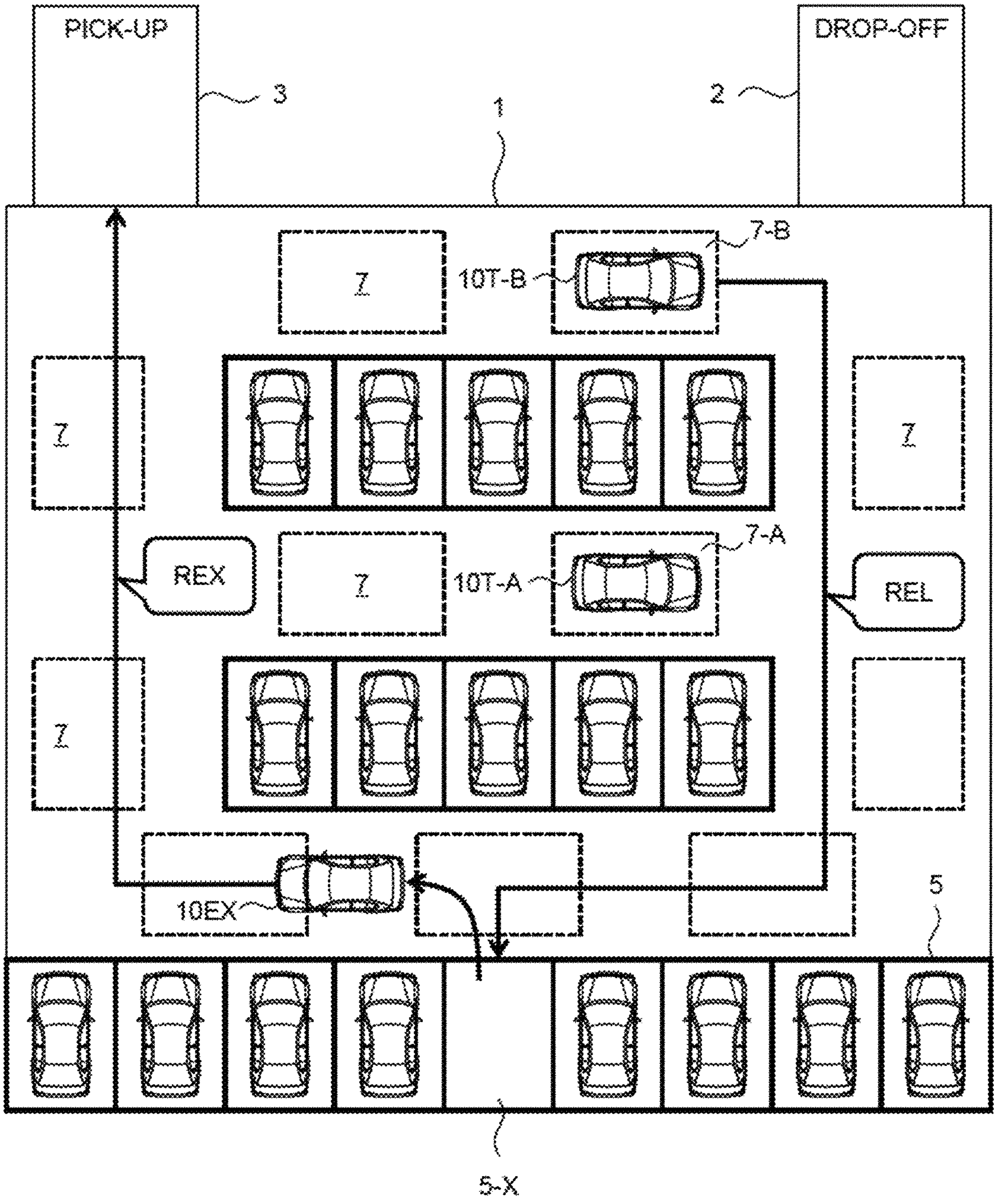
FIG. 17 is a conceptual diagram for explaining a second example of a reallocation process according to an embodiment of the present disclosure.

FIG. 17 is a conceptual diagram for explaining a second example of the reallocation process. In the second example, a first tentatively-parked vehicle 10T-A is parked in a first tentative parking space 7-A, and a second tentatively-parked vehicle is parked in a second tentative parking space 7-B. Thereafter, a regular parking space 5-X becomes available.

The processor 120 acquires the scheduled exit time of each of the first tentatively-parked vehicle 10T-A and the second tentatively-parked vehicle 10T-B based on the vehicle management information 170. The method of acquiring the scheduled exit time is as described in the above Section 5-2. Then, the processor 120 allocates the regular parking space 5-X to one of the first tentatively-parked vehicle and the second tentatively-parked vehicle 10T-B which is later in the scheduled exit time.

For example, when the scheduled exit time of the second tentatively-parked vehicle 10T-B is later, the processor 120 allocates the regular parking space 5-X to the second tentatively-parked vehicle 10T-B. Then, the processor 120 instructs the tentatively-parked vehicle 10T-B to move from the tentative parking space 7-B to the regular parking space 5-X. For example, the processor 120 generates a relocation route REL from the tentative parking space 7-B to the regular parking space 5-X based on the parking lot map information 150. Then, the processor 120 instructs the tentatively-parked vehicle 10T-B to move along the relocation route REL. The tentatively-parked vehicle 10T-B moves from the tentative parking space 7-B to the regular parking space 5-X along the relocation route REL According to the second example, the number of tentatively-parked vehicles parked in the tentative parking spaces 7 is reduced. In particular, the tentatively-parked vehicle 10T having the later scheduled exit time disappears. Therefore, the probability that the tentatively-parked vehicle 10T hinders the exiting of the exit vehicle is further effectively reduced.

6-3. Third Example

Figure 18:
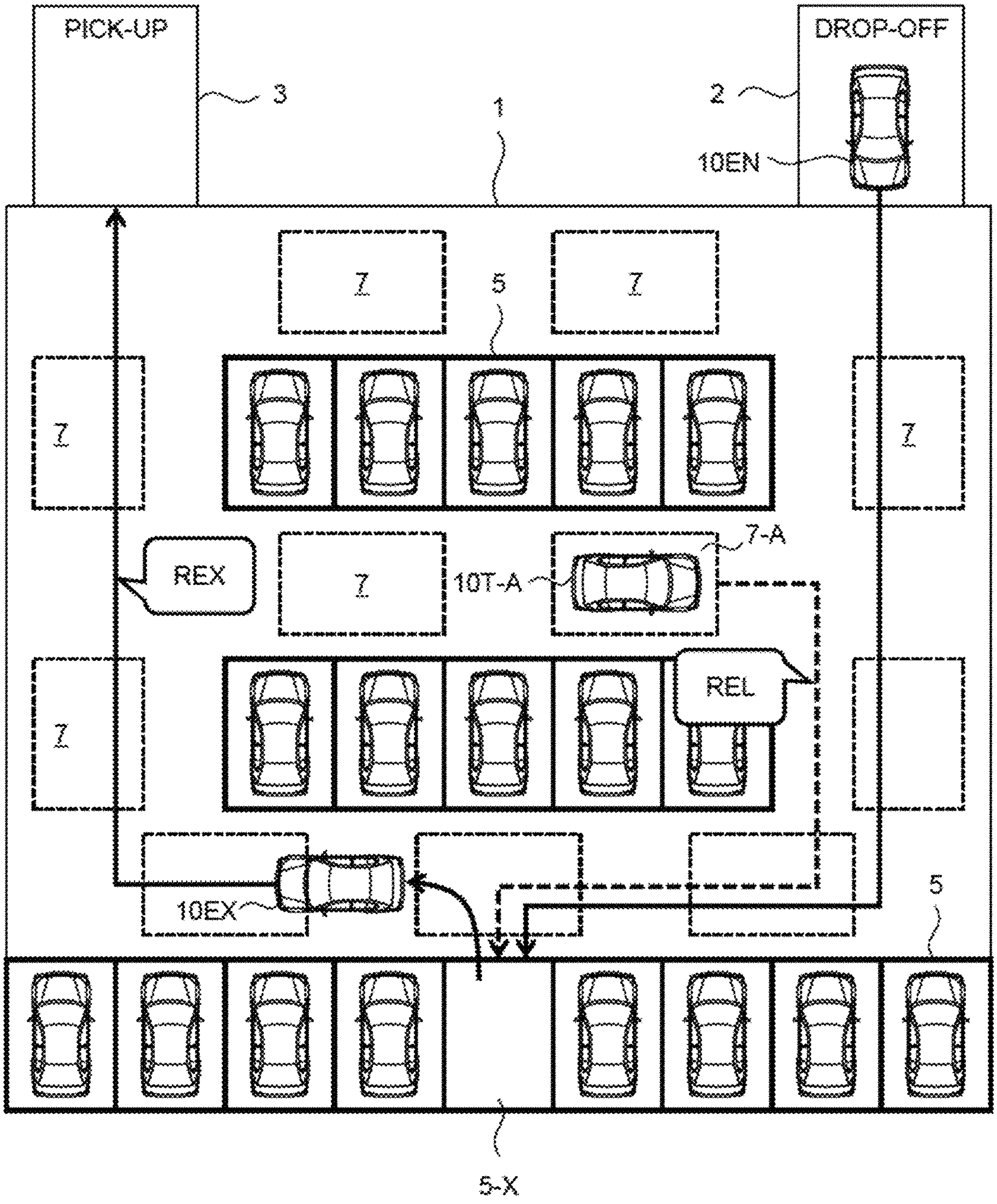
FIG. 18 is a conceptual diagram for explaining a third example of a reallocation process according to an embodiment of the present disclosure.

FIG. 18 is a conceptual diagram for explaining a third example of the reallocation process. In the third example, a tentatively-parked vehicle 10T-A is parked in a tentative parking space 7-A. Thereafter, a regular parking space 5-X becomes available. At approximately the same time, a new entry vehicle 10EN arrives at parking lot 1. That is, in a state where the regular parking space 5-X is available, both the new entry vehicle 10EN and the tentatively-parked vehicle 10T-A are present.

The processor 120 acquires the scheduled exit time of each of the tentatively-parked vehicle 10T-A and the entry vehicle 10EN based on the vehicle management information 170. The method of acquiring the scheduled exit time is as described in Section 5-2 above. Then, the processor 120 allocates the regular parking space 5-X to one of the tentatively-parked vehicle 10T-A and the entry vehicle 10EN which is later in the scheduled exit time. For example, when the scheduled exit time of the entry vehicle 10EN is later, the processor 120 allocates the regular parking space 5-X to the entry vehicle 10EN.

According to the third example, the vehicle 10 having the earlier scheduled exit time becomes the tentatively-parked vehicle 10T parked in the tentative parking space 7. The tentatively-parked vehicle 10T having the earlier scheduled exit time is expected to disappear relatively early. Therefore, the probability that the tentatively-parked vehicle 10T hinders the exiting of the exit vehicle 10EX is reduced.

What is claimed is:

1. An automated valet parking management system for managing automated valet parking in a parking lot, the automated valet parking management system comprising:

one or more processors; and one or more memory devices configured to store map information of the parking lot and vehicle management information for managing a vehicle being a target of the automated valet parking, wherein;

the one or more processors are configured to execute a tentative allocation process that allocates a tentative parking space on a passage in the parking lot to an entry vehicle, when there is no available regular parking space in the parking lot and in response to the entry instruction, the entry vehicle initiates a vehicle travel control to automatically travels on the passage to the tentative parking space, and in the tentative allocation process, the one or more processors are configured to:

acquire a scheduled exit time of a parked vehicle parked in a regular parking space, based on the vehicle management information; and when the scheduled exit time of a first parked vehicle is earlier than the scheduled exit time of a second parked vehicle, preferentially allocate the tentative parking space not present on an exit route of the first parked vehicle to the entry vehicle based on the map information and the vehicle management information, when a first regular parking space becomes available while the tentative parking space is in use, the one or more processors are configured to execute a reallocation process that newly allocates the first regular parking space to any vehicle, in the reallocation process, the one or more processors are configured to allocate the first regular parking space to a tentatively-parked vehicle parked in the tentative parking space, a first tentatively-parked vehicle is parked in a first tentative parking space, a second tentatively-parked vehicle is parked in a second tentative parking space, and in the reallocation process, the one or more processors are further configured to:

acquire the scheduled exit time of each of the first tentatively-parked vehicle and the second tentatively-parked vehicle based on the vehicle management information; and allocate the first regular parking space to one of the first tentatively-parked vehicle and the second tentatively-parked vehicle, whichever is later in the scheduled exit time.

2. The automated valet parking management system according to claim 1, wherein the vehicle management information includes the scheduled exit time specified by a user of the vehicle, and in the tentative allocation process, the one or more processors are configured to acquire the scheduled exit time specified by the user of the parked vehicle.

3. The automated valet parking management system according to claim 1, wherein the vehicle management information includes an entry time at which the parked vehicle enters the parking lot, and in the tentative allocation process, the one or more processors are configured to predict that the scheduled exit time is later than the entry time by a predetermined time.

4. The automated valet parking management system according to claim 1, wherein the vehicle management information includes a history of a past exit time of the parked vehicle, and in the tentative allocation process, the one or more processors are configured to estimate the scheduled exit time of the parked vehicle based on the history of the past exit time.

5. The automated valet parking management system according to claim 1, wherein both a new entry vehicle and a tentatively-parked vehicle parked in the tentative parking space are present in a state where the first regular parking space is available, and in the reallocation process, the one or more processors are further configured to:

acquire the scheduled exit time of each of the tentatively-parked vehicle and the new entry vehicle based on the vehicle management information; and allocate the first regular parking space to one of the tentatively-parked vehicle and the new entry vehicle, whichever is later in the scheduled exit time.

6. An automated valet parking management method for managing automated valet parking in a parking lot, the automated valet parking management method, which is executed by a computer, comprising:

acquiring map information of the parking lot and vehicle management information for managing a vehicle being a target of the automated valet parking; and executing a tentative allocation process that allocates a tentative parking space on a passage in the parking lot to an entry vehicle, when there is no available regular parking space in the parking lot and in response to the entry instruction, the entry vehicle initiates a vehicle travel control to automatically travels on the passage to the tentative parking space, and the tentative allocation process includes:

acquiring a scheduled exit time of a parked vehicle parked in a regular parking space, based on the vehicle management information; and when the scheduled exit time of a first parked vehicle is earlier than the scheduled exit time of a second parked vehicle, preferentially allocating the tentative parking space not present on an exit route of the first parked vehicle to the entry vehicle based on the map information and the vehicle management information, wherein when a first regular parking space becomes available while the tentative parking space is in use, the one or more processors are configured to execute a reallocation process that newly allocates the first regular parking space to any vehicle, wherein in the reallocation process, the one or more processors are configured to allocate the first regular parking space to a tentatively-parked vehicle parked in the tentative parking space, wherein a first tentatively-parked vehicle is parked in a first tentative parking space, wherein a second tentatively-parked vehicle is parked in a second tentative parking space, and wherein in the reallocation process, the one or more processors are further configured to:

acquire the scheduled exit time of each of the first tentatively-parked vehicle and the second tentatively-parked vehicle based on the vehicle management information; and allocate the first regular parking space to one of the first tentatively-parked vehicle and the second tentatively-parked vehicle, whichever is later in the scheduled exit time.

7. An automated valet parking management system for managing automated valet parking in a parking lot, the automated valet parking management system comprising:

one or more processors; and one or more memory devices configured to store map information of the parking lot and vehicle management information for managing a vehicle being a target of the automated valet parking, wherein the one or more processors are configured to execute a tentative allocation process that allocates a tentative parking space on a passage in the parking lot to an entry vehicle, when there is no available regular parking space in the parking lot and in response to the entry instruction, the entry vehicle initiates a vehicle travel control to automatically travels on the passage to the tentative parking space, and in the tentative allocation process, the one or more processors are configured to:

acquire a scheduled exit time of a parked vehicle parked in a regular parking space, based on the vehicle management information; and when the scheduled exit time of a first parked vehicle is earlier than the scheduled exit time of a second parked vehicle, preferentially allocate the tentative parking space not present on an exit route of the first parked vehicle to the entry vehicle based on the map information and the vehicle management information, when a first regular parking space becomes available while the tentative parking space is in use, the one or more processors are configured to execute a reallocation process that newly allocates the first regular parking space to any vehicle, wherein:

both a new entry vehicle and a tentatively-parked vehicle parked in the tentative parking space are present in a state where the first regular parking space is available, and in the reallocation process, the one or more processors are further configured to:

acquire the scheduled exit time of each of the tentatively-parked vehicle and the new entry vehicle based on the vehicle management information; and allocate the first regular parking space to one of the tentatively-parked vehicle and the new entry vehicle, whichever is later in the scheduled exit time.

* * * * *